(12) United States Patent
Tatewaki et al.

(10) Patent No.: US 7,163,322 B2
(45) Date of Patent: Jan. 16, 2007

(54) ILLUMINATION DEVICE FOR LICENSE PLATE

(75) Inventors: Yasumasa Tatewaki, Aichi (JP); Toshinori Takahashi, Aichi (JP); Yoshiharu Tanaka, Aichi (JP); Akihiro Misawa, Aichi (JP); Kazutoshi Ikeda, Aichi (JP); Takao Adachi, Aichi (JP); Katsumi Esaka, Aichi (JP); Tatsuya Oba, Aichi (JP)

(73) Assignee: Toyoda Gosei Co., Ltd., Aichi (JP)

( * ) Notice: Subject to any disclaimer, the term of this patent is extended or adjusted under 35 U.S.C. 154(b) by 0 days.

(21) Appl. No.: 10/943,162

(22) Filed: Sep. 17, 2004

(65) Prior Publication Data
US 2005/0094405 A1    May 5, 2005

(30) Foreign Application Priority Data

| Sep. 19, 2003 | (JP) | ............................ P2003-327312 |
| Oct. 10, 2003 | (JP) | ............................ P2003-351681 |
| Mar. 19, 2004 | (JP) | ............................ P2004-079632 |
| Mar. 22, 2004 | (JP) | ............................ P2004-081874 |

(51) Int. Cl.
*B60Q 1/56* (2006.01)
(52) U.S. Cl. .................................................... 362/497
(58) Field of Classification Search ............... 362/497, 362/498, 499, 240, 241
See application file for complete search history.

(56) References Cited

U.S. PATENT DOCUMENTS

| 5,934,798 | A | * | 8/1999 | Roller et al. ................. 362/497 |
| 6,799,877 | B1 | * | 10/2004 | Watkins et al. ............. 362/542 |
| 2002/0196638 | A1 | * | 12/2002 | Stephens et al. ............ 362/497 |
| 2003/0128549 | A1 | * | 7/2003 | Matsuura et al. ........... 362/497 |
| 2003/0227780 | A1 | * | 12/2003 | Katsuo et al. .............. 362/497 |

FOREIGN PATENT DOCUMENTS

| JP | 63-185745 | 11/1988 |
| JP | 2-54745 | 4/1990 |

* cited by examiner

*Primary Examiner*—Renee Luebke
*Assistant Examiner*—Julie A. Shallenberger
(74) *Attorney, Agent, or Firm*—McGinn IP Law Group, PLLC.

(57) ABSTRACT

In an illumination device for license plate which illuminates the license plate from the front side thereof, at least one light source consist of a white LED is arranged at a position upward or obliquely upward of the license plate in such a manner that optical axes thereof traverse with a lower range than the center of the license plate, and a reflector is arranged at a position obliquely downward seen from an observer's side of the light source, receiving a light directing to the observer's side from a portion of a light emitted from the light source, and converting the light into a light irradiating the center or the lower part of the license plate. Further, a garnish for accommodating the light source and having a light transmitting part can be provided to the illumination device.

19 Claims, 26 Drawing Sheets

ILLUMINATION DEVICE FOR LICENSE PLATE

This application is based on Japanese Patent Applications No. 2003-327312, 2003-081874, 2003-351681 and 2004-079632, which are incorporated herein by reference.

BACKGROUND OF THE INVENTION

1. Field of the Invention

The present invention relates to an illumination device applied to illuminate a license plate of a vehicle.

2. Description of the Related Art

As an illumination device for a license plate of a vehicle, such a system has broadly been utilized, where a light source is arranged at a position upward or obliquely upward of the license plate for irradiating the light emitted from the light source to the surface of the license plate. For the light source, bulbs (electric lamps) are ordinarily employed, but since the bulb does not have especial directivity, it cannot illuminate the surface of the license plate with a light of uniform illumination, so that this matter decreases recognition of letters or numerals shown on the license plate, and degrades the design characteristic.

On the other hand, a LED (light emitting diode) has been proposed to utilize to the light source because of merits of saving energy or having a long life. However, with the technical level of nowadays, a luminous flux as high as the bulb cannot be provided with one LED. Even if serving the highly brightened LED, similarly to the case of the bulb, there still remains a problem that difference in illumination appears in ranges near to and remote from the LED in the license plate. Although the illumination increases as a whole if increasing the using number of LEDs, there would be caused other problems such as limitation to positions of installing the LEDs or increasing in cost.

As the related art of the invention, refer to JP-UM-A-2-54745 and JP-UM-A-63-185745.

If lighting the whole of the license plate when employing the LED as the light source, it is considered to adjust the light emitting direction of the LED such that the LED's optical axis crosses with the center of the license plate. But, with such a structure, actually, the illumination is remarkably prominent around ranges near the LED, causing an irregularity of illuminance. On the other hand, if adjusting the light emitting direction of the LED such that the LED's optical axis crosses with a lower range than the center of the license plate, there increases the light not used to the illumination of the license plate, causing the illuminating effect reduced.

Further, in order to enhance the visibility of the license plate of the vehicle at night, the surface of the license plate is irradiated with light. According to this front light type lighting method, the license plate is directly irradiated with a light sent from the light source arranged in either an upper portion, a lower portion or a side portion of the license plate. In order to more excellently light the license plate, a method of using a reflector has been proposed (refer to JP-UM-A-2-54745). According to the method, not only the license plate is directly irradiated with a light emitted from the light source but also a region distant from the light source is irradiated with a light reflected on a reflector. Due to the foregoing, the overall surface of the license plate is uniformly irradiated with light so that the irregularity of illuminance may be reduced.

In order to enhance the design of an entire of the vehicle or each portion of the vehicle, there have been making every effort. Accordingly, even in a license plate section, not only it is necessary to enhance the visibility of the license plate at night but also it is required to enhance the design and the decoration of the license plate portion.

As a result of the investigation made in view of the above problems to be solved, in order to enhance the design, it is considered to be effective that not only the license plate is illuminated but also a light emitting portion is provided in the circumference of the license plate. For example, when a light emitting portion, the shape of which is the same as letters or a logotype mark, is provided on an observation face of a garnish for accommodating the light source of the license plate and this light emitting portion is made to emit light at night, the license plate portion can be decorated by the light emitting portion. However, in this case, it is necessary to provide another light source for supplying light to the light emitting portion arranged in the garnish. When it is considered that a space in the garnish is limited to be small, it is difficult to arrange another light source in addition to the light source for the license plate in the garnish. Further, to provide both light sources in the garnish is not preferable in view of the design. Furthermore, when two types of light sources are arranged in the limited space in the garnish, the assembling work becomes complicated.

SUMMARY OF THE INVENTION

In view of the above-mentioned problems, an object of the invention is to make the illumination uniform and heighten the illumination in lighting the license plate of the vehicle.

For accomplishing the above object, the invention provides following structures.

According to a first aspect of the invention, an illumination device for a license plate comprises at least one light source arranged in a circumference of the license plate and a reflector converting a light emitted from the light source into a light irradiating the license plate, wherein the light source consists of a white LED.

According to a second aspect of the invention, the light source of the illumination device is arranged at a position upward or obliquely upward of the license plate so as to intersect optical axes with a lower range than the center of the license plate, and the reflector is arranged at a position obliquely downward seen from an observer's side of the light source so as to convert a light directing to the observer's side from a portion of the light emitted from the light source into a light irradiating the center or the lower part of the license plate.

According to the invention, the light source is arranged, such that optical axis thereof traverses with the lower range than the center of the license plate, whereby the portion of high brightness of the light from the light source is used to lighting of the center or the lower part of the license plate. Such a manner restrains the quantity of light emitting to the upper part of the license plate being the range near the light source, and carries out positive light emission to the center or the lower part of the license plate being the range separate from the light source. In addition, the light not used directly to lighting the license plate is converted to a light emitting to the center or the lower part of the license plate, thereby to supplement the illumination to the center or the lower part of the license plate. These actuations make the illumination uniform all over the license plate, and can accomplish an illuminating embodiment of less irregularity of illuminance.

On the other hand, the above actuations by the reflector increase the quantity of light in total used to the illumination of the license plate, and brings about the lighting embodiment excellent in the lighting effect.

According to a third aspect of the invention, the light source is arranged at a position upward or obliquely upward of the license plate and the reflector is arranged at a position obliquely downward seen from an observer's side of the light source, the area when the reflector is viewed from the top of which is substantially the same as that of the license plate or is larger than that of the license plate, which converts a light directing to the observer's side from a portion of the light emitted from the light source into a light for irradiating the center or a lower part of the license plate.

In the invention, the license plate can be lighted by light from the light source and reflected light by the reflector by covering the rear of a vehicle in which the license plate is arranged with a reflector having transparency and arranging the light source between the license plate and the reflector. As the center to the lower part of the license plate is lighted by light from the light source and reflected light from the reflector by setting the contour of the reflecting surface of the reflector so that reflected light lights the center to the lower part of the license plate, illuminance in an area far from the light source is captured. The illuminance of the whole license plate is uniformed by these actions and lighting having little irregularity of illuminance can be achieved.

Further, light hitherto directly radiated outside can be effectively utilized by the above-mentioned actions by the reflector, total luminous energy utilized for lighting the license plate increases and lighting having excellent lighting effect is acquired.

Besides, the design of the rear of the vehicle can be enhanced by forming the contour of the reflector in accordance with the contour of the rear of the vehicle.

According to a fourth aspect of the invention, the illumination device further comprises a garnish for accommodating the light source and having a light transmitting part, and a spectral member for generating a first light to irradiate the license plate and a second light to irradiate the garnish from the light emitted from the light source.

In the illumination device of the intention, when two types of light are generated, that is, when a light for lighting the license plate and a light sent to the garnish light transmission portion are generated, the license plate can be lighted simultaneously when light is supplied to the garnish light transmission portion. Accordingly, it is unnecessary to individually provide a light source for lighting the license plate and a light source used for the garnish light transmission portion. Therefore, a space for arranging the light source can be reduced. Further, when one light source is used in common between the lighting of the license plate and the lighting of the garnish light transmission portion, the number of parts may be decreased. Accordingly, the production cost may be reduced and the assembling property maybe enhanced. In this connection, when the garnish light transmission portion is formed into a desired shape such as a shape of a letter or a logotype, the design of the license plate portion can be effectively enhanced.

DETAILED DESCRIPTION OF THE PREFERRED EMBODIMENTS

Each component forming the invention will be described below.

(Light Source)

In the invention, for a light source, an LED, a bulb, a fluorescent lamp or a cold-cathode tube can be used. It is desirable that out of them, the LED is adopted. As an LED light source has little power consumption and a small heating value and has long life, it is a light source suitable for continuously lighting for a long time. As the LED light source is small-sized, large space for the light source is not required and a illumination device according to the invention can be miniaturized and thinned. Hereby, the handling quality of the illumination device is also enhanced. Besides, as the LED is strong in vibration and shock, there is also an advantage that the illumination device having high reliability can be formed.

Figure 3A:
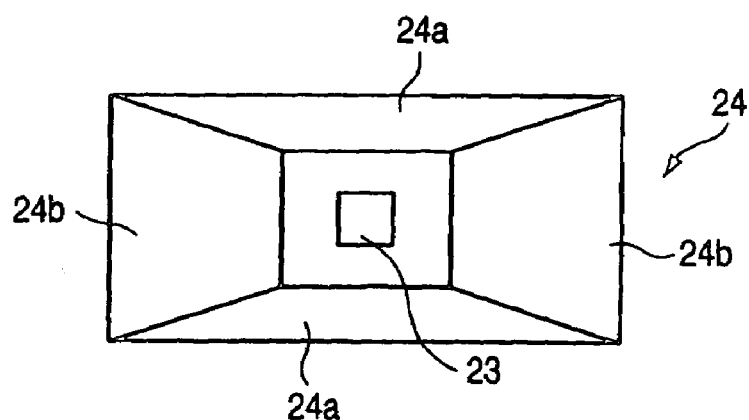
FIGS. 3A to 3C are views showing the examples of an LED used in the invention.
Figure 3B:
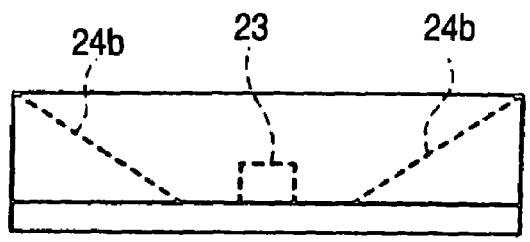
Figure 3C:
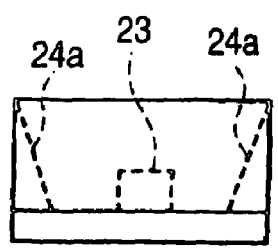

No limitation is especially made to types of the LEDs, and various kinds such as lamp type or chip type may be employed. When using the invention, it is preferable to use the LED enabling to emit wider lights in a lateral direction than in a vertical direction. Depending on such LED, it is possible to light the whole of the license plate with the lesser number of LEDs. The characteristic of light distribution of the LED can be controlled by a reflector housed therein. Specifically, as shown in FIGS. 3A to 3C, if using the LEDs housing therein the reflector surrounding a LED chip 23 with four faces, where (in the reflector) oblique angles of two faces 24a being respectively parallel in a lateral direction of the license plate are smaller than the oblique angles of the other two faces 24b, it is possible to provide the characteristic of light distribution satisfying the above-mentioned object.

Lighting colors are not especially limited to those emitted from the LEDs, and it is possible to employ the LEDs emitting colors within a visible range such as white, red, orange, green, blue, and others. A preferable LED emits a while light, because if selecting the LED emitting the white light, the illumination device may be structured such that numerals, letters, or background are observed in the inherent colors (visually recognized). If selecting colors other than the white, the design of the license plate is varied, or the design property is heightened by, for example, adding colors to the license plate.

The LED emitting lights in an ultraviolet range may be also applied. In this case, a fluorescent substance can be cooperated, which receives the light in the ultraviolet range and emits the fluorescent light. The light sources enabling to emit lights in the visible and fluorescent ranges can be employed.

In case of using the fluorescent substance, it is possible to furnish a layer including, for example, the fluorescent substance on a surface of a later mentioned light permeable cover. Such a layer including the fluorescent substance can be formed by printing or coating an ink or paint including the fluorescent substance, or pasting a sheet containing the fluorescent substance. Otherwise, the fluorescent substance can be included within the light permeable cover. With these structures, the fluorescent light occurs in the light permeable cover, and the illumination is carried out by emitting the fluorescent light from the light emitting face of the light permeable cover.

It is also possible to include the fluorescent substance in the license plate being an illuminating object. For example, the display of the license plate (numerals or letters) is formed by using the paint or ink containing the fluorescent substance, or the display is furnished on the surface independently with the layer including the fluorescent substance. In this structure, the light in the ultraviolet range issued from the light source emits to the license plate and excites the fluorescent substance. As a result, the display of the license plate is made illuminate.

No limitation is especially made to kinds of the fluorescent substances, and any kinds may be employed, irrespective of organic or inorganic groups. If using the organic fluorescent substances, the light of the fluorescent color can have a clear feeling. On the other hand, if using the inorganic fluorescent substances, the light of the fluorescent color can have a matting feeling. The fluorescent substances having various fluorescent lights can be used, and other than the fluorescent substances having, for example, the fluorescent colors in red, green or blue being the three primary colors, the fluorescent substance lighting medium tones among them can be used. A plurality of fluorescent substances can be combined, for example, the fluorescent substances of the red, green and blue groups can be used in combination.

A plurality of LEDs may be used. If using the plurality of LEDs, such effects are brought about as widening the illuminating range, strengthening the illuminance, or reducing the irregularity of the illuminance. Further, if combining the LEDs of different luminous colors, the illumination of various luminous colors can be realized by combining colors. The number of using the LEDs is determined by synthetically considering brightness or directive angle of using the LEDs, or required illuminance. In case of using the plurality of LEDs, the LEDs are disposed with spaces along the upper end of the license plate (typically, the LEDs are arranged in a row). Depending on this arranging embodiment, the irregularity of illuminance is reduced in the lateral direction of the license plate. In case of using the LEDs of more than three, it is preferable to dispose the LEDs equidistantly, because an illuminance balance of the whole illuminating light is made more preferable.

When using the plurality of LEDs, all of LEDs are not necessarily the same in the directions of the optical axes. For example, in order that the lights of the overall LEDs are wider in a lateral direction of the license plate, the respective LEDs are disposed, in such a manner that the distance between the optical axis of the center LED light source (may be plural) and the optical axis of the peripheral LED light source (may be plural) becomes gradually separate in the direction of the light advancing (specifically, for example, the optical axes of the central LEDs direct just below, while the optical axes of the peripheral LEDs direct obliquely downward). The directions of the optical axes of the respective LEDs can be determined by taking the piece number of using the LEDs or the arranging embodiment into consideration. It is also sufficient to divide the using LEDs into plural classes, and make the same the directions of the optical axes of the LEDs belonging to the respective classes.

As above-mentioned, it is sufficient that the plurality of LEDs different in the directions of the optical axes are put together to be the light source unit. The thus composed light source unit may be plural, and in such a case, the respective light source units are disposed with spaces along the upper end of the license plate.

For making the illuminance uniform in the lateral direction of the license plate, it is desirably considered to arrange the LEDs following the upper end of the license plate, for example, equidistantly. But, owing to a problem of interference with other devices or mechanisms (trunk opener or back camera) used to the license plate, it is sometimes difficult to dispose the LEDs on the center or at the end of the license plate. In such a case, if determining the direction of the optical axes of the LEDs disposed in the perimeter (left and right) of the range refusing disposal of the LEDs toward the refusing range, shortage of illuminance is desirably supplemented in the range.

The LED is arranged over a license plate or diagonally above it. Therefore, in the illumination device according to the invention, the display surface of the license plate is lighted by light on the upside or from the diagonal upside. In the meantime, in the inventions LED is arranged so that its optical axis crosses an area lower than the center of the license plate and light in a direction of the optical axis out of light from the LED, that is, light having high luminance is utilized for lighting the center to the lower part of the license plate. Luminous energy radiated into an area close to the LED light source on the license plate is inhibited by such a characteristic and simultaneously, the illuminance of an area apart from the LED light source is reinforced. Further, as a part of radiated light is reflected on a reflector and reflected light irradiates a lower area of the license plate, the irregularity of the whole illuminance is reduced. Considering positional relation between LED and the license plate and distance between both when the illumination device is applied to a vehicle, it is desirable that LED is arranged so that its optical axis crosses an area close to the lower end of the license plate to make balance in illuminance more satisfactory.

The light source such as LED and a bulb may be provided to a position close to an outside wall of the rear of the vehicle to exhaust heat by emission. Particularly, heat exchange is accelerated by mounting LED on a substrate made of a high thermally conductive member such as aluminum and touching the substrate to the outside wall of the rear of the vehicle, the heat of the device is exhausted, and the deterioration of luminous efficiency is prevented.

One embodiment of the invention arranges the LEDs such that the optical axes do not cross with the license plate. That is, in this embodiment, the directions of the optical axes of the LEDs are lower than the lower end of the license plate or toward the observer's side (for example, the directions of the optical axes of the LEDs can be almost the same as the normal direction of the face of the license plate). In this embodiment, the license plate is illuminated exclusively by the light effected by later mentioned reflectors. Accordingly, the light emitting angle to the face of the license plate can be worked, so that a desirable light distribution can be realized over the wide range of the license plate. The illumination device may be structured such that all of the substantial lights emitted from the LEDs are effected by actions of the later mentioned reflectors, and then those are utilized for illuminating the license plate. That is, the illumination device may be structured such that the license plate is substantially illuminated by only the light optically controlled by the reflector. In this embodiment, the LEDs are arranged such that the optical axes cross with the reflectors.

(Reflector)

The reflector used in the invention is arranged at the places obliquely downward of the above-mentioned LED light sources seen from the side of the observer. The reflector has a light reflecting face opposite to the LED light source. The reflecting face receives the lights from the portion of the LED light source, the lights directing to the observer (the opposite side of the license plate), and generates the reflecting lights emitting to the center or the lower part of the license plate. As far as obtaining such actuations, the reflecting faces are not limited in shapes. The reflecting face is preferably curved for efficiently using the reflected lights and distributing the reflected light in good balance.

The reflector may be formed at one portion with a convex curved face. In this structure, the reflected light obtained by the portion is made wider. Accordingly, diffusion of the light is accelerated, and the illumination of all the reflected lights is made uniform. This structure may create the light emitting over a wider range. The convex curved faces may be formed in plural ranges. For example, when using a plurality of LED light sources, the convex curved faces are respectively formed in the ranges where the optical axes of the respective LED light sources cross one another. In this structure, the lights of the respective LED light sources are reflected and diffused concurrently.

The reflecting face is not limited in size, either, but is sized enough to satisfactorily exhibit the above-mentioned actions. Preferably, for heightening a rate of using the light, the reflecting face having a dimension enabling to receive substantially all the lights of the LED lights toward the observer is employed.

The reflector can be made by forming a material of the light reflective property or a suitable material, followed by covering the reflecting face with the light reflective property. The material of the reflective property herein may exemplify metals as aluminum or silver, or resins of the white group.

In addition to the above-mentioned reflector (called as "first reflector" in the following explanation), a second reflector can be used. The second reflector is arranged obliquely downward of the license plate of the LED light sources, and receives the lights directing upward than the license plate the lights from a portion of the LED light source so as to generate the lights in the directions of the license plate or of the reflector. If using the second reflector, it is possible to utilize the light for illuminating the license plate, (without the second reflector, this light would have directed upward of the license plate and could not be utilized for illuminating the license plate), and therefore the light using rate is heightened to increase the illuminating effect. In particular, the second reflector is preferably composed such that the reflective light thereby progresses in the direction of the first reflector. Depending on this structure, it is possible to finally obtain the light illuminating the center or the lower part of the license plate. As a result, the illumination in the range of the license plate is supplemented to improve the illuminating balance.

The first and second reflectors are exclusively used to reduce the irregularity of illuminance in the upper and lower directions of the license plate. As mentioned above, owing to a problem of interference with other devices or mechanisms (trunk opener or back camera) used to the license plate, it is sometimes difficult to dispose the LEDs on the center or at the end of the license plate. Among the lights emitted from the LEDs, since one portion of the lights in the laterally directional component emits outside of the license plate, there have existed lights not usefully used to illuminate the license plate. Taking the above-mentioned circumstances into consideration, one embodiment of the invention employs a third reflector for objects of enabling to positively emit the light to ranges assumed to lack the light and/or increasing the light using efficiency. This third reflector is arranged at the place adjacent the LEDs disposed in the circumference (left and right) of the range refusing the disposal of the LEDs, or at both ends of the light source unit. In case of the light source units (including the LEDs) being plural, the third reflector may be provided at only one end most toward both ends of the license plate. The third reflector is used in combination with the first or the first and second reflectors. The third reflector may be composed as one body in combination with the first or the first and second reflectors.

Further, the reflector used in the invention may be arranged in a state in which the reflector covers the light source and the license plate in the rear of the vehicle such as on a trunk lid, a back door and a bumper. Therefore, the light source and the license plate are arranged between the outside wall of the rear of the vehicle and the reflector. The reflector is arranged substantially in parallel to the optical axis of the LED light source so that light radiated from LED is easily diagonally incident on the reflector. When the incidence angle of light incident on the reflector exceeds the critical angle of the reflector, the incident light is reflected on the reflector to be reflected light and is radiated toward the license plate. The reflected light becomes light that irradiates the center to the lower part of the license plate. As long as such action is acquired, the contour of a reflecting surface is not particularly limited. To efficiently utilize reflected light and to distribute the reflected light in a balanced state, it is desirable that the reflector has a curved surface. Besides, considering coupling with another member such as the trunk lid, the fringe can be formed so that it is planar and a concave portion can be provided to the fringe. On the surface of an observation face made of such multiple curved surfaces, the reflection of outside light is made in more directions, the excellent effect of optical diffusion is produced, and the glare to a following vehicle is prevented. Rainwater and dust can be prevented from entering by attaching the reflector to the rear of the vehicle in a sealed state.

It is desirable that the observation face is bilaterally symmetrical and/or vertically symmetrical. It is natural that the design of the appearance of the reflector itself is enhanced by such configuration, however, as a bilaterally (and/or vertically) symmetrical reflection mode is acquired, the design is also satisfactory from an optical viewpoint.

It is desirable that considering the size of an irradiated object, a reflector provided with an optical radiation face having area when viewed from the top that can cover the whole irradiated object is used. It is preferable to configure the reflector more compactly that a reflector the contour when viewed from the top of the optical radiation face of which is substantially the same as that of the irradiated object or slightly larger than that of the irradiated object is used.

As long as the action of the reflector that radiates incident light toward the irradiated object is sufficiently acquired and the reflector has no problem in intensity, it is desirable that as a thin reflector as possible is used. For example, a light transmission plate having the thickness of 1 to 15 mm can be used for the reflector. When the light transmission plate is thinner, it is not desirable because mechanical strength is not sufficiently acquired. When the light transmission plate is thicker, it is natural that installation space is required in vain in case the reflector is fixed to the irradiated object and it is not desirable, however, it is not desirable because the production cost is increased. A light transmission plate desirably having the thickness of 2 to 10 mm, preferably having the thickness of 2 to 5 mm can be used for the reflector.

The material of the reflector is not particularly limited if only light radiated toward the license plate is transmitted at the back of the vehicle. It is desirable that the reflector is made of transparent (including transparent and colorless and transparent and colored) material. Besides, it is desirable that the reflector is made of material easy to process and excellent in durability. For the material of the reflector, acrylic resin, polyethylene terephthalate (PET), polycarbonate resin, epoxy resin or glass can be used.

(Light Transmissive Cover)

A light transmission cover can be furnished to cover the LED light sources and the reflectors. Material qualities of the light transmission cover are not especially limited, as far as being permeable with respect to the lights of the LED light sources. Desirably, the light transmission cover is composed with transparent materials (including colorless and colored transparences). Further, it is desirable to compose the light transmission cover with such materials easy in processing and excellent in durability. Specifically, the light transmission cover can be formed with materials as acrylic resin, polyethylene terephthalate (PET), polycarbonate resin, epoxy resin, or glass.

The light transmission cover performed with the light diffusion treatment may be used. Such a light transmission cover exhibits the light diffusing effect when the light passes through the light transmission cover. By this actuation, the irregularity of illuminance of the light may be reduced. The light diffusion treatment in the light transmission cover is carried out by forming wrinkles (furrows) of regular or irregular patterns on the surface of the light transmission cover or pasting a light diffusing film on the same. It is also sufficient to include a light diffusing agent (for example, silica gel or titanium oxide) within the light transmission cover, not carrying out the light diffusion treatment on the surface of the light transmission cover, in order to provide the light diffusing action within the light transmission cover.

Further, it is also sufficient to form the outer surface (enough with one part thereof) of the light transmission cover to be shaped as a convex lens so as to provide a light converging effect. By making use of this light converging effect, the characteristic of light distribution of the light illumination may be controlled.

(Garnish)

The light source may be accommodated in a garnish. The garnish is comprised of a body portion, which is referred to as a garnish body portion in this specification hereinafter, and a light transmission portion, which is referred to as a garnish light transmission portion in this specification hereinafter, provided on an observation face of the body. Material of the garnish body portion is not particularly limited. However, when consideration is given to the forming property and the durability, the garnish body portion is usually made of resin such as polypropylene resin or acrylonirile butadiene styrene (ABS) resin, or alternatively the garnish body portion is usually made of metal such as aluminum or stainless steel. The shape of the garnish body portion is not particularly limited. While consideration is being given to the sense of togetherness and the design, any desired shape can be adopted.

Concerning the material of the garnish light transmission portion, as long as it is transmitted by light, synthetic resin such as acrylic resin, polyethylene terephthalate (PET) resin, polycarbonate resin, silicon resin or epoxy resin can be adopted. Alternatively, inorganic material such as glass can be adopted. The shape of the garnish light transmission portion is not particularly limited. It is possible to adopt any desired shape such as a letter, a logotype, a geometrical figure composed of a straight line or a curve or a geometrical pattern while consideration is being given to the sense of togetherness and the design.

(Spectral Member)

Concerning the spectral member, as long as it can generate a first light and a second light, the structure of the spectral member is not particularly limited. In this case, the first light is irradiated to the license plate, and the second light is irradiated to the garnish light transmission portion.

In one embodiment of the illumination device of the invention, the spectral member is comprised of a light guiding member made of light transmission material. Concerning the material of the light guiding member, as long as it has a light transmission property, the material of the light guiding member is not particularly limited. It is possible to adopt synthetic resin such as acrylic resin, polyethylene terephthalate (PET) resin, polycarbonate resin, silicon resin or epoxy resin. Alternatively, organic material such as glass can be adopted. The light guiding member includes a light incident face upon which light emitted from the light source is incident, a first light emitting face for emitting the first light generated from a potion of the light incident from the light incident face, and a second light emitting face for emitting the second light generated from a portion of the light incident from the light incident face. A light incident from the light incident face is reflected in the light guiding member or transmitted through the light guiding member. Then, the light is emitted in a predetermined direction from the first light emitting face and the second light emitting face.

In another embodiment of the invention, the spectral member includes a first reflecting face to generate a first beam of light from a portion the received light, and a second reflecting face to generate a second beam of light from a portion the received light. Examples of the first and the second reflecting face are a reflecting face made of white resin and a reflecting face made of metal such as Al or Ag. Concerning the shapes of the first and the second reflecting face, as long as they can individually reflect the received light in a predetermined direction, the shapes are not particularly limited. An example of the shapes is a paraboloid. The first reflecting face and the second reflecting face may be composed being integrated with each other into one body. That is, the first reflecting face and the second reflecting face may be composed being continued to each other while they have a portion in common.

In this connection, the spectral member may generate only one of the first light and the second light. That is, the spectral member is provided with a reflecting face for reflecting the received light in the direction of the license plate (the garnish light transmission portion), and a portion of the light emitted from the light source may be made to directly advance in the direction of the garnish light transmission portion (the license plate).

In still another embodiment of the illumination device of the invention, LED is used for the light source, and this LED is provided with a sealing member for generating the first light and the second light from the light emitted from the light emitting element. Concerning LED, it is preferable to use LED disclosed in the International Publication No. WO 03/049207. According to the embodiment of the light emitting diode disclosed in the above official gazette, by the interface formed by the sealing member of LED, a light substantially perpendicular to the optical axis of the emitted light and a light substantially parallel to the optical axis of the emitted light are generated from the emitted light of the light emitting element of LED. The light substantially perpendicular to the optical axis of the emitted light is the first light, and the light substantially parallel to the optical axis of the emitted light is a second light.

The illumination device of the invention is served by attaching to the circumference of the license plate.

The embodiments of the invention will be explained in more detail with reference to the attached drawings.

(First Embodiment)

Figure 1:
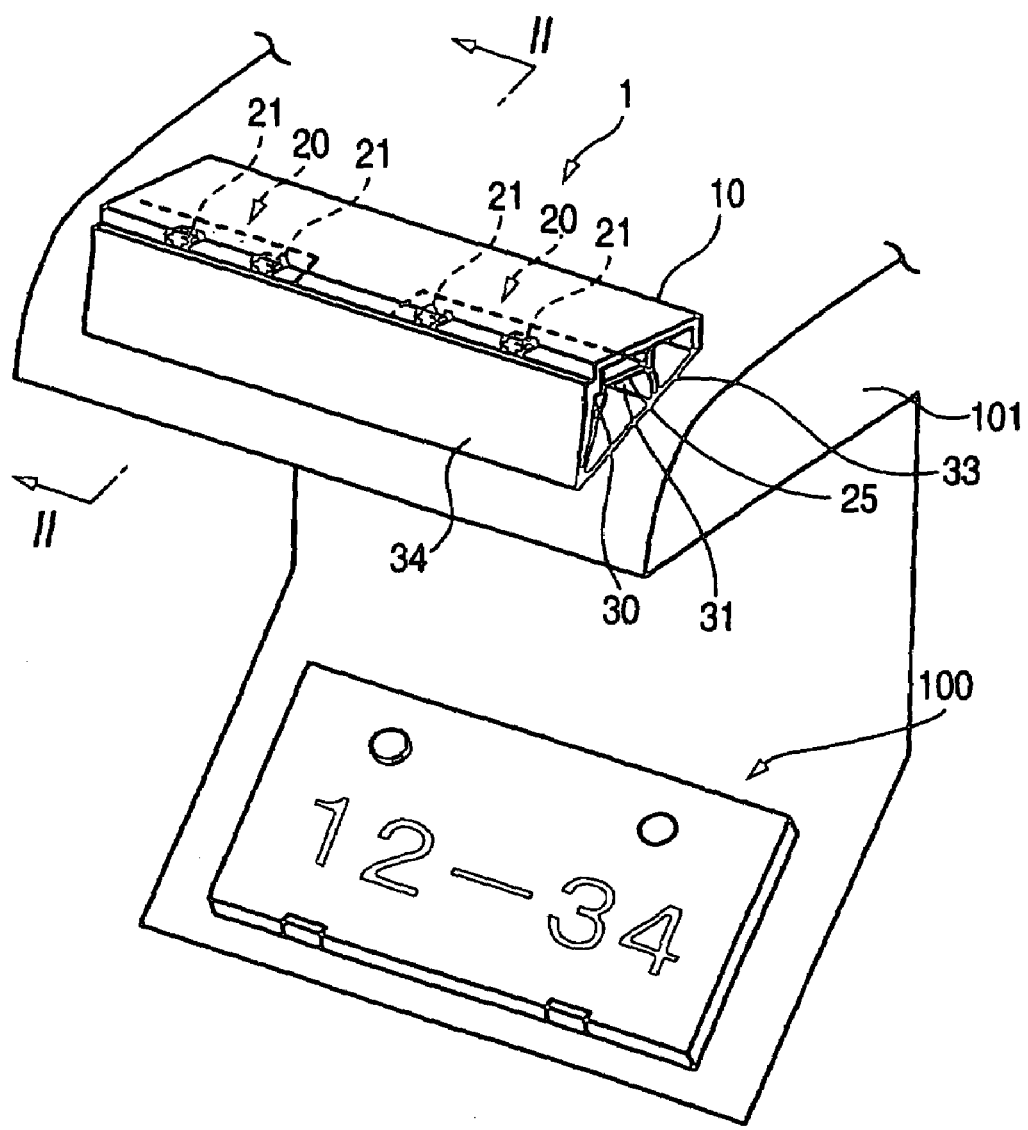
FIG. 1 is a perspective view showing a state in which a illumination device for a license plate according to a first embodiment of the invention is used.
Figure 2:
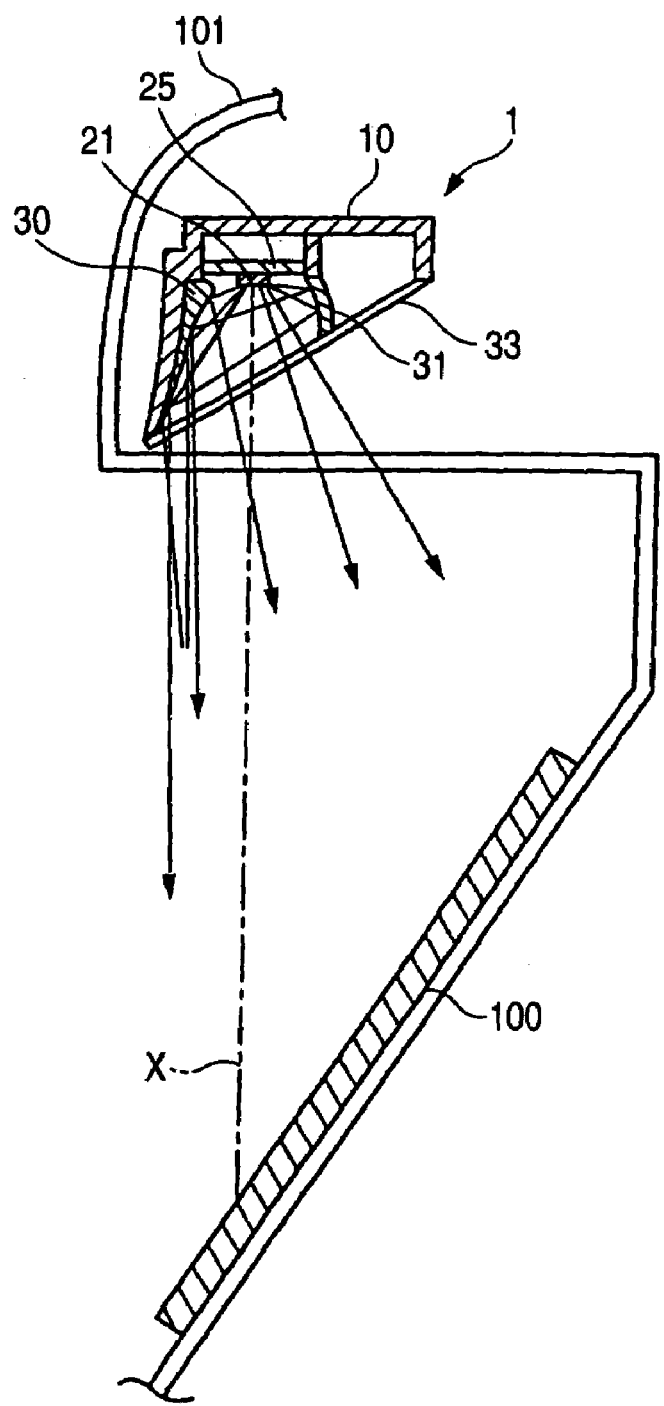
FIG. 2 is a cross sectional view taken along the line II—II in FIG. 1.

FIG. 1 is a perspective view showing the condition of a license plate illumination device 1 (hereafter called as "illumination device 1") according to a first embodiment of the invention is used. FIG. 2 is a cross sectional view taken along the line II—II in FIG. 1. The illumination device 1 is an illumination device for a rear license plate of a vehicle, which is arranged within an upper garnish 101 of the rear license plate. The illumination device 1 has a case 10, an LED unit 20, a first reflector 30, a second reflector 31, and a cover 33.

The illumination device 1 uses the two LED units 20, and each LED unit 20 has two LEDs 21 and a substrate 25. The LED 21 is a chip type LED that emits white light. The LED 21 has a reflector 24 surrounding the lateral directions of the LED chip 23 with the four faces (see FIGS. 3A to 3C). The oblique angles of opposite faces of the reflector 24 are equal, while the oblique angles of the adjacent faces are different. The respective LEDs 21 are mounted on the substrate 25 such that a pair of faces 24a of the small oblique angle of the reflector 24 are parallel with the length axes (lateral direction) of the rear license plate 100, and as a result, the LEDs 21 emit the lights wider in the lateral direction than the vertical direction of the rear license plate 100. The substrate 25 is mounted with protective resistors other than the LEDs 20, and a wiring pattern is formed such that the respective LEDs 21 are connected in series.

The respective LED units 20 are furnished to a case 10 such that the LEDs 21 housed therein are in a row. A straight line connecting the LEDs 21 is almost parallel with the upper end of the rear license plate 100. The light emitting directions from the LEDs 21 are adjusted such that, when working the illumination device 1, the optical axes X cross with the lower part of the rear license plate 100.

The first reflector 30 is provided at the obliquely lower position of the LED unit 20 seen from the observer's side. On the other hand, the second reflector 31 is provided at the obliquely lower position of the rear license plate 100 of the LED unit 20. Each of the first and second reflectors 30 and 31 has the reflective face at the surface opposite to the LED unit 20. This reflective face is prepared with Al for preferably reflecting the white light.

The reflective face of the first reflector 30 has a large curvature in the range approaching the LEDs unit 20, and the cross sectional face in every position has the curved face of the same shape, so that the light of the LEDs unit 20 emitted there is converted into a light directing to the center or the lower part of the rear license plate 100. The reflective face of the second reflector 31 has the curved shape of the constant curvature, and the cross sectional face in every position has the curved face of the same shape, so that the light of the LED unit 20 emitted there is converted into a light directing to the first reflector 30.

The cover 33 is made of the light transmission material (for example, acrylic resin), and attached to the case 10 for protecting the light emitting side of the LEDs unit 20.

Then, the illumination device 1 will be explained in an illuminating embodiment. When the LED unit 20 is supplied with current, each of the LEDs 21 is lighted. Among the lights emitted from the LEDs 21, the light directing in the optical axis and the light being off a bit from the optical axis pass through the cover 33, and then go toward the center or the lower part of the rear license plate 100 (the most brightened light goes to the lower part of rear license plate 100). That is, the highly brightened portion of the lights from the LEDs 21 is used to illumination of the center or the lower part of the rear license plate 100. On the other hand, the lights toward the observer's side of the light from the LEDs 21 emit to the first reflector 30, and then are converted into lights directing to the center or the lower part of the rear license plate 100 by reflecting action by the first reflector 30. Among the lights emitted from the LEDs 21, the light issued toward the upper part than the upper end of the rear license plate 100 emit to the second reflector 31, and are converted into lights directing to the first reflector 30 by reflecting action by the second reflector 31. The thus generated light directs in the direction of the rear license plate 100 by receiving the reflective action of the first reflector 30, and emits to the rear license plate 100 via the cover 33.

In the above-mentioned illumination device 1, the highly brightening portion in the lights of the LEDs 21 is used for lighting the center or the lower part of the license plate, thereby to control the quantity of light emitting the rear license plate 100 to which the light of the LEDs 21 is easy to reach, because of approaching the LEDs 21, and thereby to positively emit the center or the lower part of the rear license plate 100 to which the light is difficult to reach. In addition, the illumination at the center or the lower part of the rear license plate 100 is supplemented by the action of the first reflector 30. Besides, since the first reflector 30 has the curved face as mentioned above, the light generated thereby (reflected light) is distributed to the center or the lower part of the rear license plate 100. The illumination is made uniform all over the rear license plate 100 together with the above-mentioned actions, and becomes the illustrated embodiment of less irregularity of illuminance.

On the other hand, the light is effectively used by means of the first and second reflectors 30, 31. That is, the light using rate is heightened by installing the first and second reflectors 30, 31, and the light of high illumination is obtained.

In response to the rear license plate 100 longer in the lateral direction than in the vertical direction, the light wider in the lateral direction of the rear license plate 100 is emitted from the respective LEDs 21, so that it is possible to illuminate the whole of the rear license plate 100 with the lesser number of LEDs, and at the same time, the irregularity of illuminance is suppressed in the lateral direction.

Figure 4:
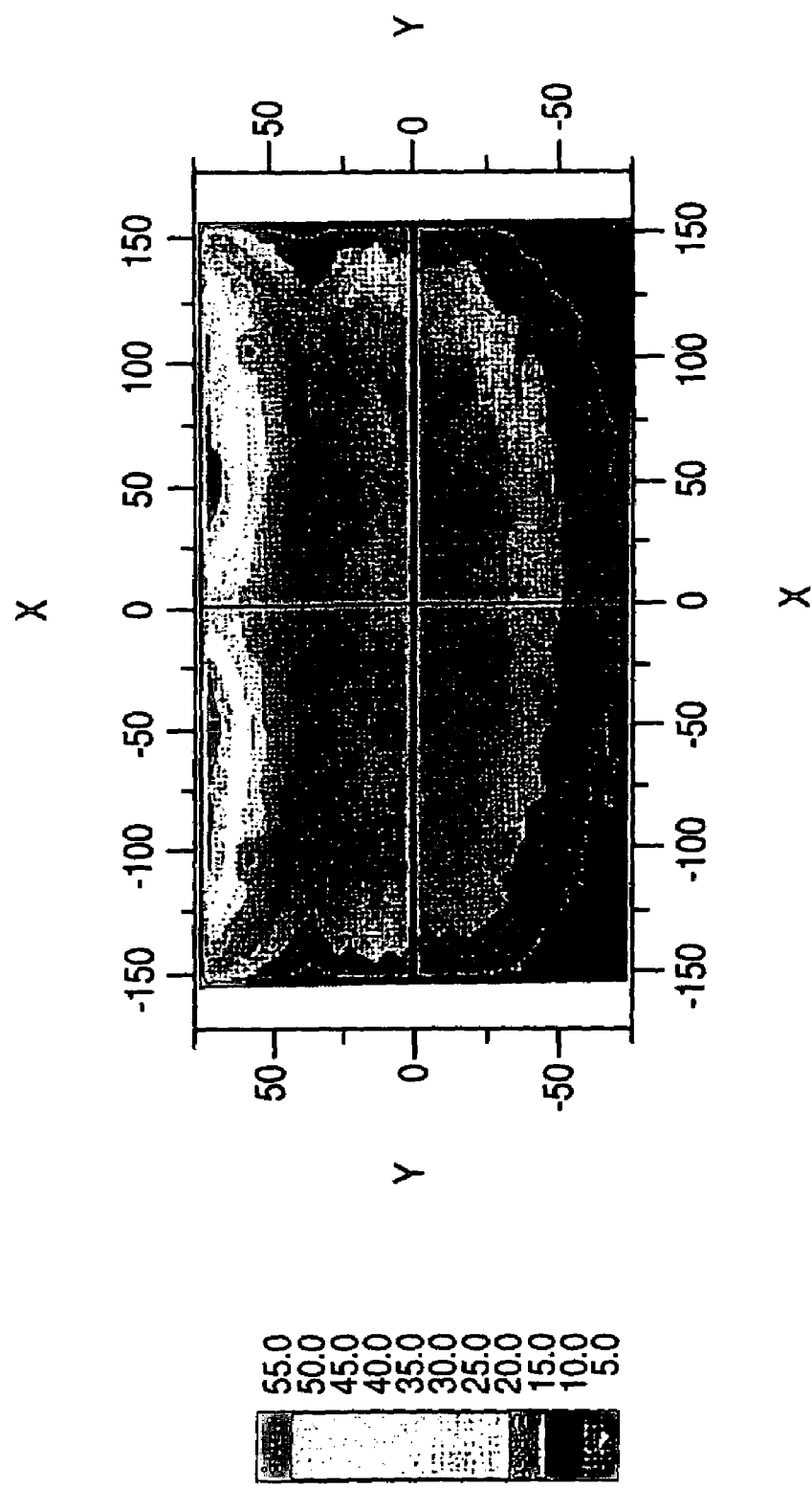
FIG. 4 is a view showing a result of a simulation of the illuminating distributions based on the structure of the embodiment.

FIG. 4 shows results of simulations of the illuminating distributions based on the structure of the illumination device 1. The simulation used the LEDs of directive angle being around 120°, and the four LEDs were in succession arranged with spaces of 70 mm, 90 mm, and 70 mm. The vertical direction of the rear license plate was an X axis, the center of the rear license plate was reference (0), the upper side was plus (mm) and the lower side was minus (mm). Similarly, the horizontal direction of the license plate was a Y axis, the center of the license plate was reference (0), the right side was plus (mm), and the left side was minus (mm). The illumination of each point was expressed by an absolute illumination simulating one LED as luminous flux of 1 lumen.

As is seen from FIG. 4, although there exist somewhat parts of high illumination at the upper end part of the rear license plate, it is seen that the illuminating lights preferable in the illuminating balance all over the whole are available.

(Second Embodiment)

Figure 5:
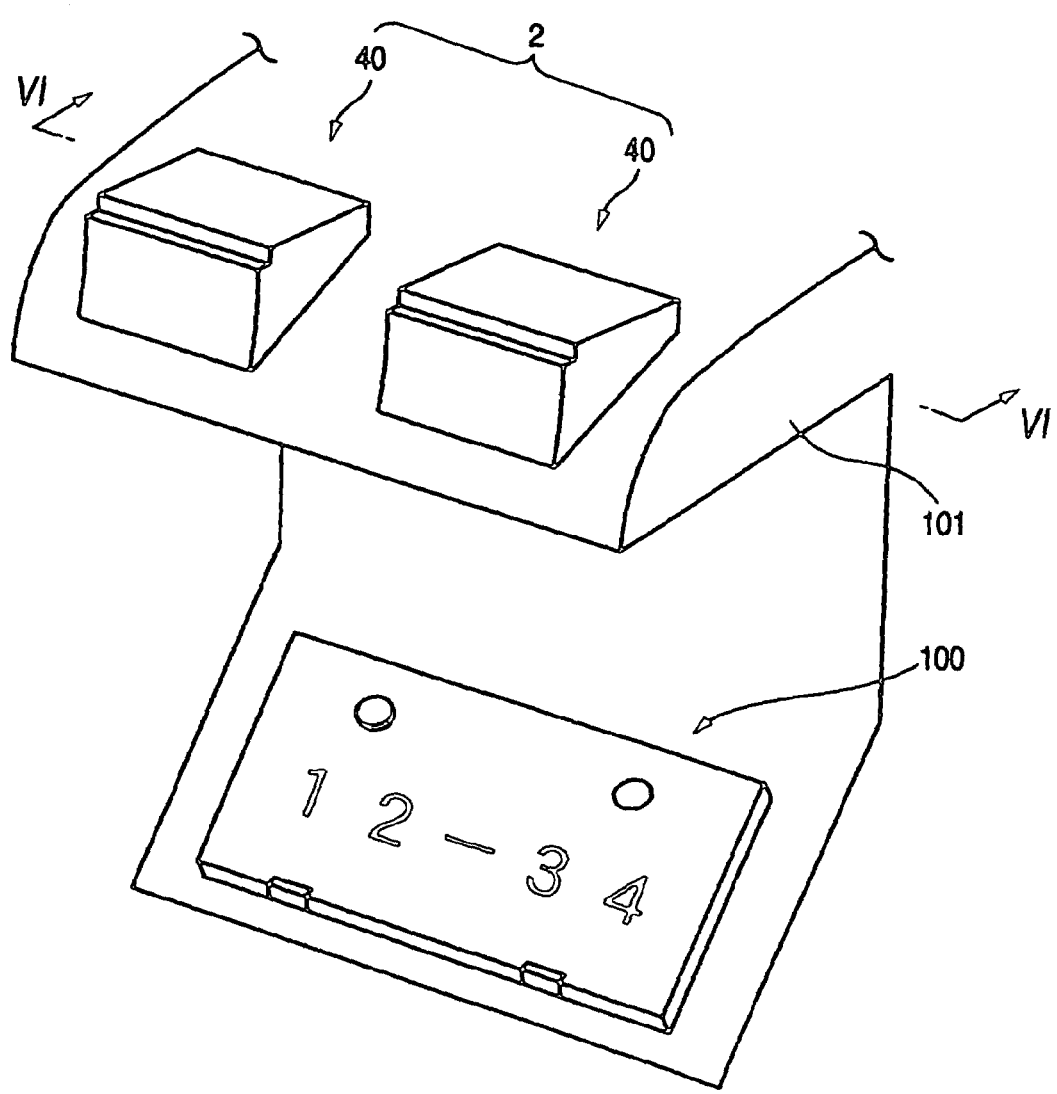
FIG. 5 is a perspective view showing the using condition of the license plate illumination device 2 according to the second embodiment of the invention.
Figure 6:
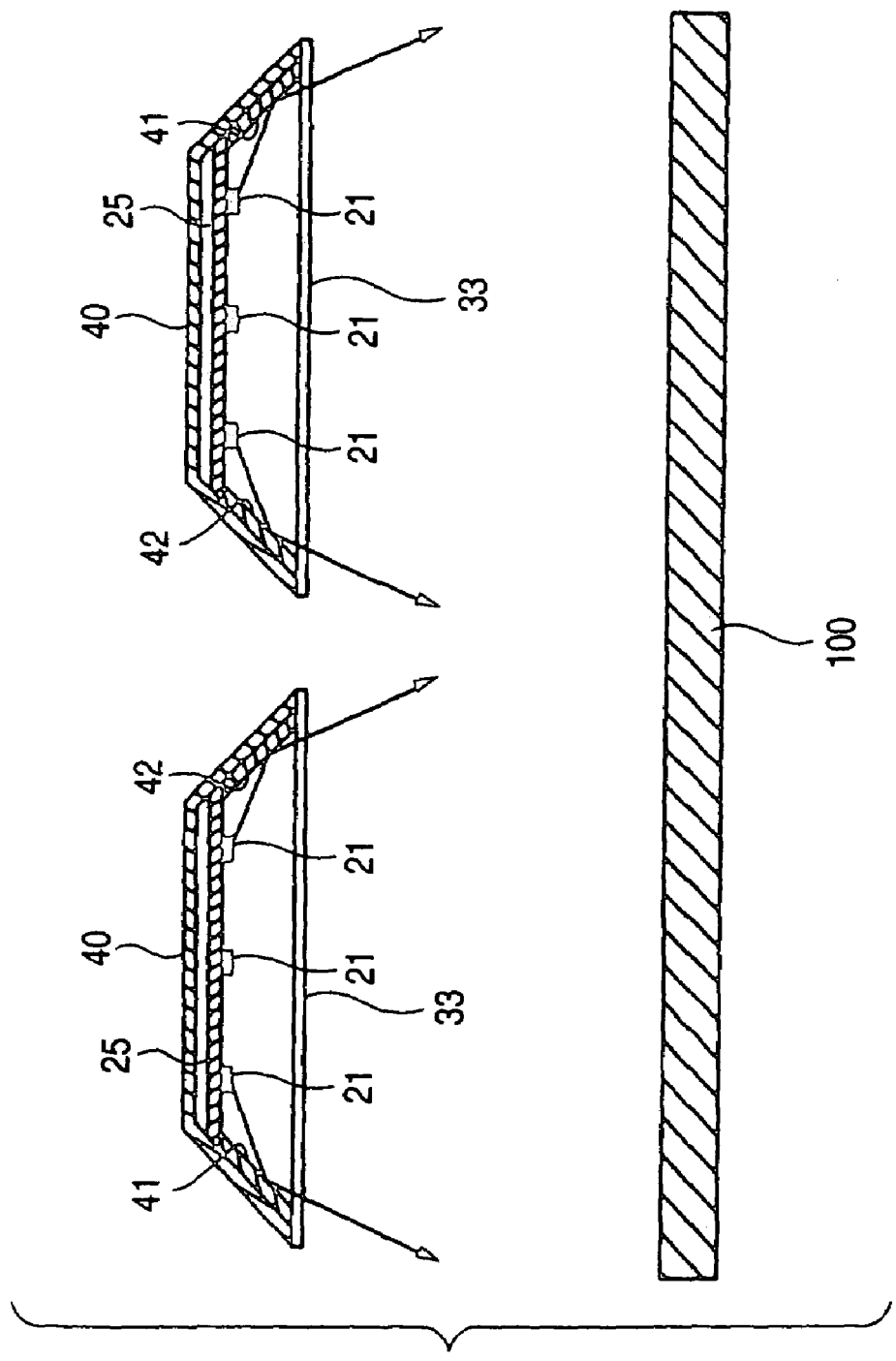
FIG. 6 is a cross sectional view taken along the line VI—VI in FIG. 5.

FIG. 5 is a perspective view showing the condition of the license plate illumination device 2 (hereafter called as "illumination device 2") according to a second embodiment of the invention is used. FIG. 6 is cross sectional views taken along the line VI—VI in FIG. 5. In the following explanation, the same members as those of the above-mentioned embodiment are give the same signs and omit explanation.

The illumination device 2 uses two light source units 40 which are arranged with the space between both along the lateral direction of the rear license plate 100.

Each of the light source units 40 houses three LEDs 21 therein. The straight line connecting the LEDs 21 is almost parallel with the upper end of the rear license plate 100. The light emitting directions from the LEDs 21 are adjusted such that, when working the illumination device 2, the optical axes cross with the lower part of the rear license plate 100.

The light source unit 40 has the third reflectors 41 and 42 having the reflective faces crossing with the laterally directional axes of the rear license plate 100. The reflective face is formed with Al for preferably reflecting the white color. The third reflector 41 has a shape for converting the light of the LEDs 21 emitted there into a light directing to a corner of the upper end of the license plate 100. On the other hand, the third reflector 42 has a shape for converting the light of the LEDs 21 emitted there into a light directing to the center of the upper end of the license plate 100.

Then, the illuminating embodiment of the illumination device 2 will be explained. In the illumination device 2, similarly to the above-mentioned illumination device 1, in addition to making uniform the illumination by the actions of the first and second reflectors 30, 31 and realizing the high illumination, the following works and effects are exhibited by the third reflectors 41, 42. One portion emitted in the lateral direction of the lights of the LEDs 21 is reflected by the third reflector 41. As a result, a light going to the corner of the upper end of the rear license plate 100 is generated. The illumination is thereby supplemented at the corner of the upper end of the rear license plate 100. Similarly, the illumination is supplemented at the center of the upper end of the rear license plate 100 by the action of the third reflector 42. In the illumination device 2, the illumination is supplemented in the range lacking the illumination because of limiting the arrangement of the light source unit 40 by the third reflectors 41 and 42. Consequently, it is possible to light the whole of the rear license plate 100 under the condition of lesser irregularity of illuminance.

The embodiment is so structured as to generate the light illuminating the corner of the upper end of the rear license plate 100 and the light illuminating the center of the same by means of the third reflectors 41 and 42, but the illuminating area of the reflected light by the respective reflectors is appropriately designed, taking the range lacking the illumination in the rear license plate 100 into consideration. For example, there is a case of presuming shortage of illumination at the corner of the lower end of the rear license plate 100 depending on the structure of other members or the installing embodiment of the light source unit 40, and in this case, a design can be performed such that, for example, the reflected light by the reflector 41 emits the range.

Figure 7:
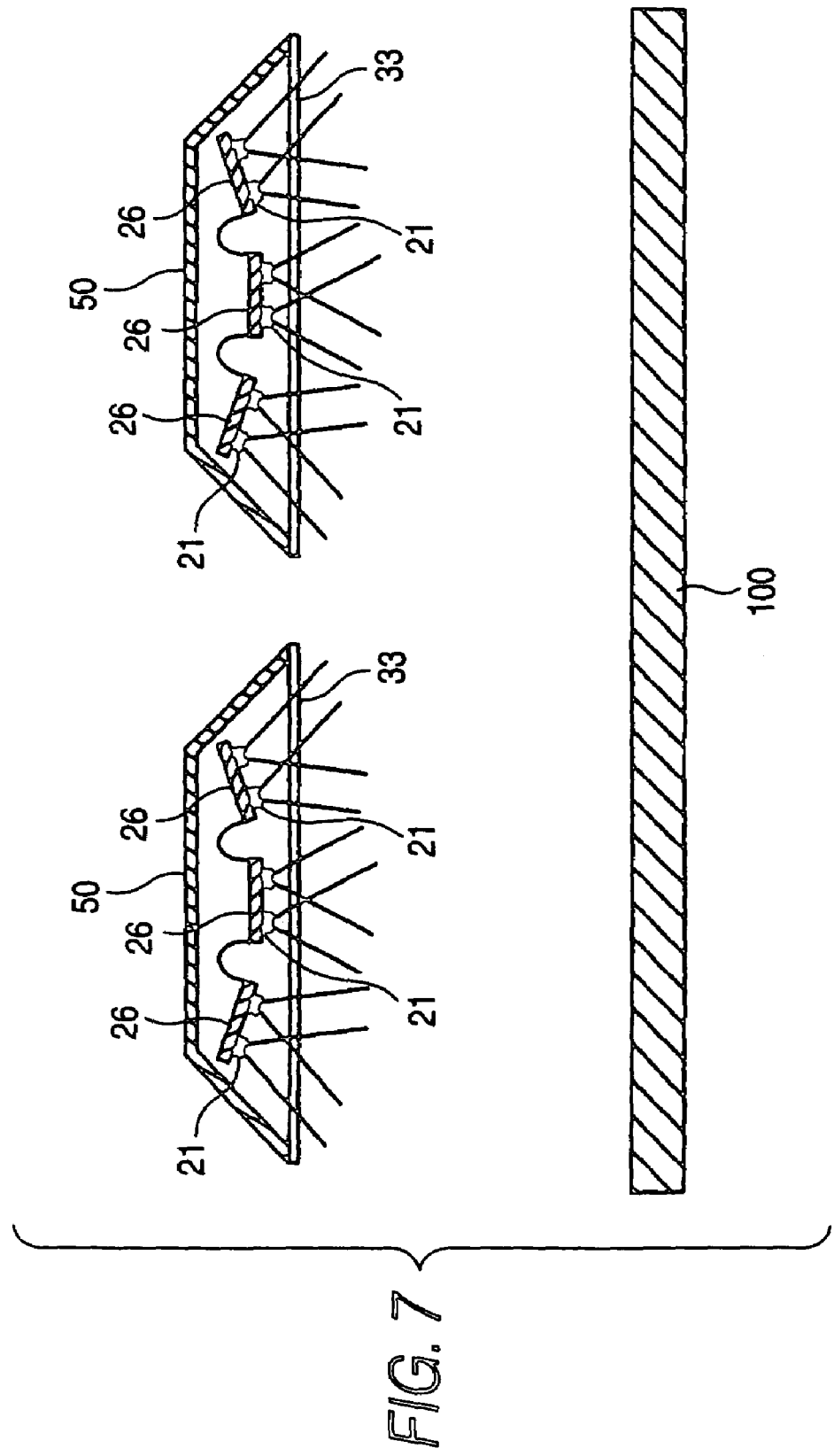
FIG. 7 is a cross sectional view showing one example of arranging embodiments of the LEDs light source in the light source units.

In the above-mentioned illumination device 2, the third reflectors 41 and 42 are used, so that the light directing to the range lacking the illumination is generated for reducing the irregularity of illuminance, and as shown in FIG. 7, similar works or effects can be obtained by changing the arranging embodiment of the LEDs 21 housed in the light source unit. In this structure, each of the light source units 50 houses the LEDs six in total therein. The LEDs 21 make a pair of the two and are mounted on the substrate 26, and the substrates 26 are connected by a metal plate. As shown, the optical axes of the LEDs 21 mounted on the central substrate 26 direct just below, and the optical axes of the LEDs 21 mounted on the substrate 26 placed toward the ends of the rear license plate 100 direct to the end parts of the rear license plate 100, while the optical axes of the LEDs 21 mounted on the substrate 26 placed toward the center of the rear license plate 100 direct in the central direction. By adopting the arranging embodiments of the LEDs 21 as mentioned above, the lights emitted from the respective light source units 50 are made wider. Accordingly, the lights are positively emitted to the ranges presuming the shortage of illumination, such as the corner or the center of the upper end of the rear license plate 100, and it is possible to light the rear license plate 100 with the lights of lesser irregularity of illuminance. Also in this case, the third reflector may be further arranged.

Figure 8:
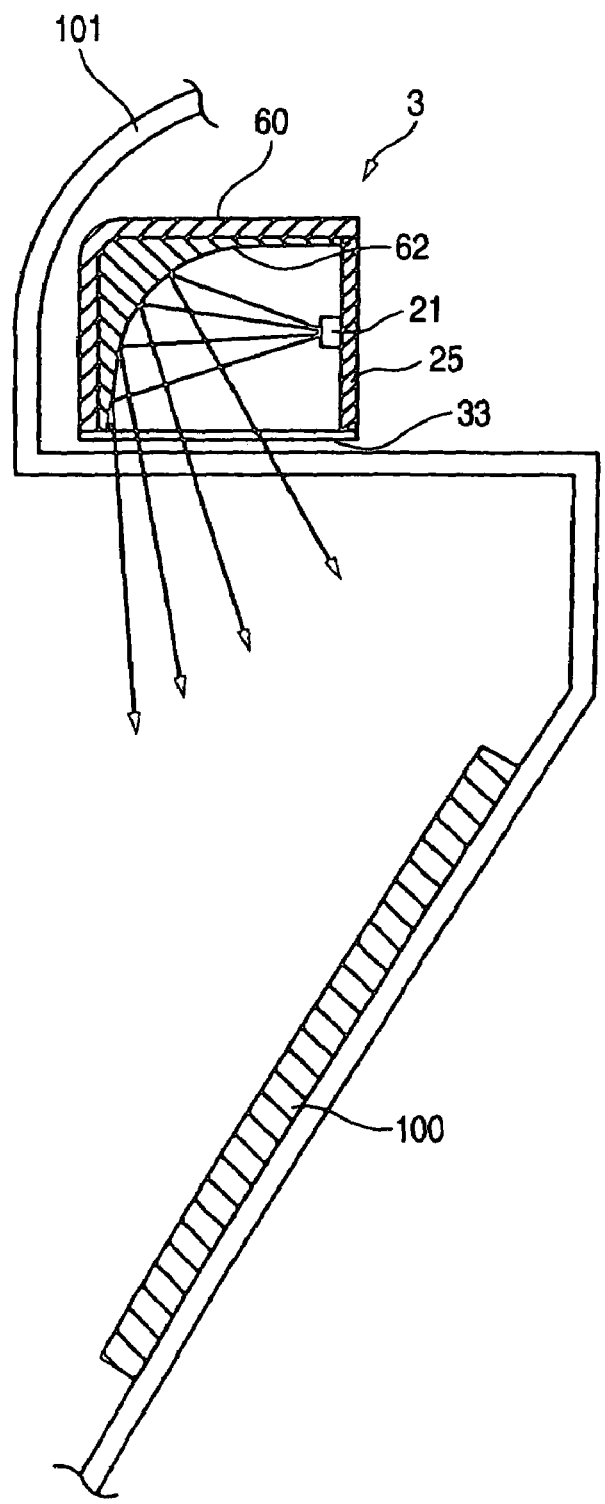
FIG. 8 is a cross sectional view in the direction perpendicular to longitudinal axis of the license plate 100, showing the illumination device 3 of the license plate of the other embodiment according to the invention.
Figure 9:
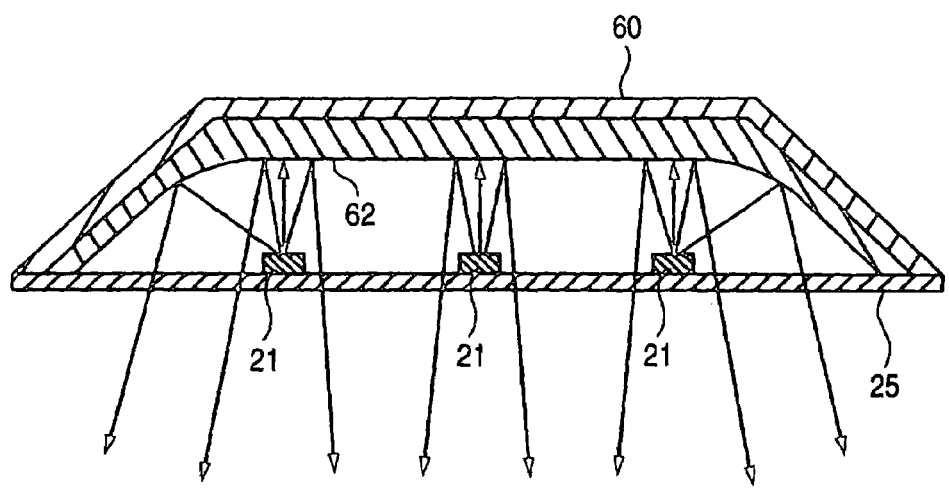
FIG. 9 is a cross sectional view in the horizontal direction of the light source unit used to the illumination device 3 for the license plate.

The above-mentioned illumination device 2 uses the light source units 40 housing therein the LEDs 21 so disposed that the optical axes of the illumination device 2 cross with the lower part of the rear license plate 100, and one portion of the lights from the LEDs 21 directly emit to the rear license plate 100, and as shown in FIGS. 8 and 9, it is also sufficient to use the light source units 60 housing therein the LEDs 21 so disposed that the optical axes of the illumination device 2 cross with the lower part of the reflector 62, and substantially all of the lights from the LEDs 21 directly emit to the rear license plate 100 via the reflector 62. FIG. 8 is a cross sectional view (cross sectional view in the vertical direction of the light source unit 60) in the vertical direction with the length axis of the license plate 100, and FIG. 9 is a cross sectional view in a horizontal direction of the light source unit 60. In both Figures, the same members as those of the above-mentioned embodiments are give the same signs to omit the explanation.

The illumination device 3 of this embodiment emits to the reflector 62 substantially all of the lights issued from the LEDs 21. As a result, depending on the shape of the reflector 62, lights of controlled distribution are generated and emit to the license plate 100. In this illumination device 3, the license plate 100 is emitted with the only lights optically controlled by the reflector 62 (depending on the directivity or the arranging embodiment of the used LEDs, one part of the LEDs lights may be directly emitted to the license plate). The reflector 62 of the embodiment comprises the concave curved face, and is so designed as to preferably distribute the reflected light. As shown in FIG. 7, the reflector 62 has the shape continuing to both ends of the light source units such that it also receives the lights emitted in the lateral direction from the LEDs 21. Thereby, the lights from the LEDs 21 can be effectively used to realize the light of higher illumination.

(Third Embodiment)

Figure 10:
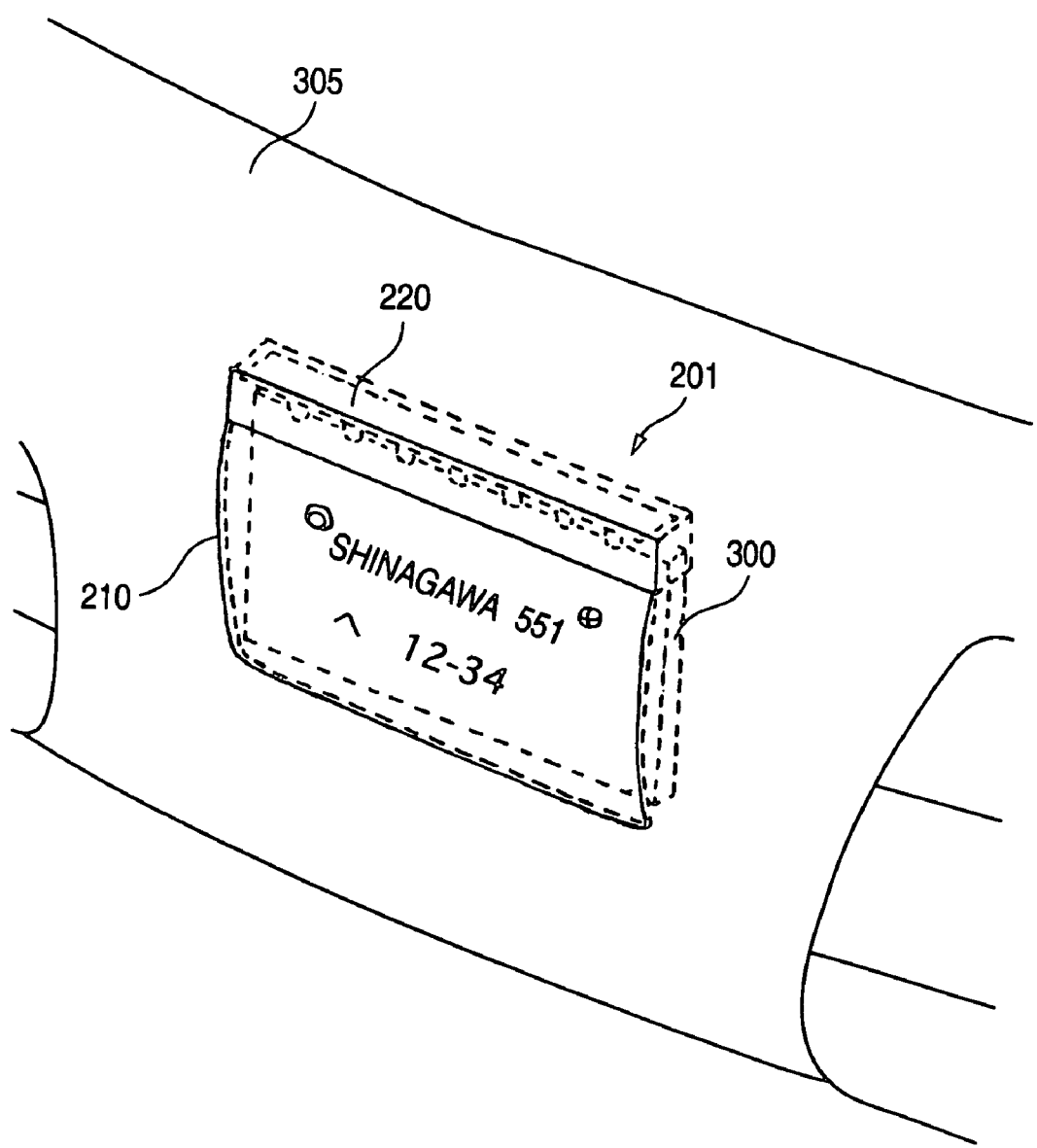
FIG. 10 is a perspective view showing a state in which a license plate illumination device 201 according to a third embodiment of the invention is used.

FIG. 10 shows a state in which a license plate illumination device 201 (hereafter called as "illumination device 201") according to a third embodiment of the invention is attached to a trunk lid 205 in the rear of a vehicle. A license plate 300 and an LED unit 220 are provided in a concave portion (not shown) provided to the trunk lid 305 and a reflector 210 is arranged so that it closes the concave portion.

Figure 11:
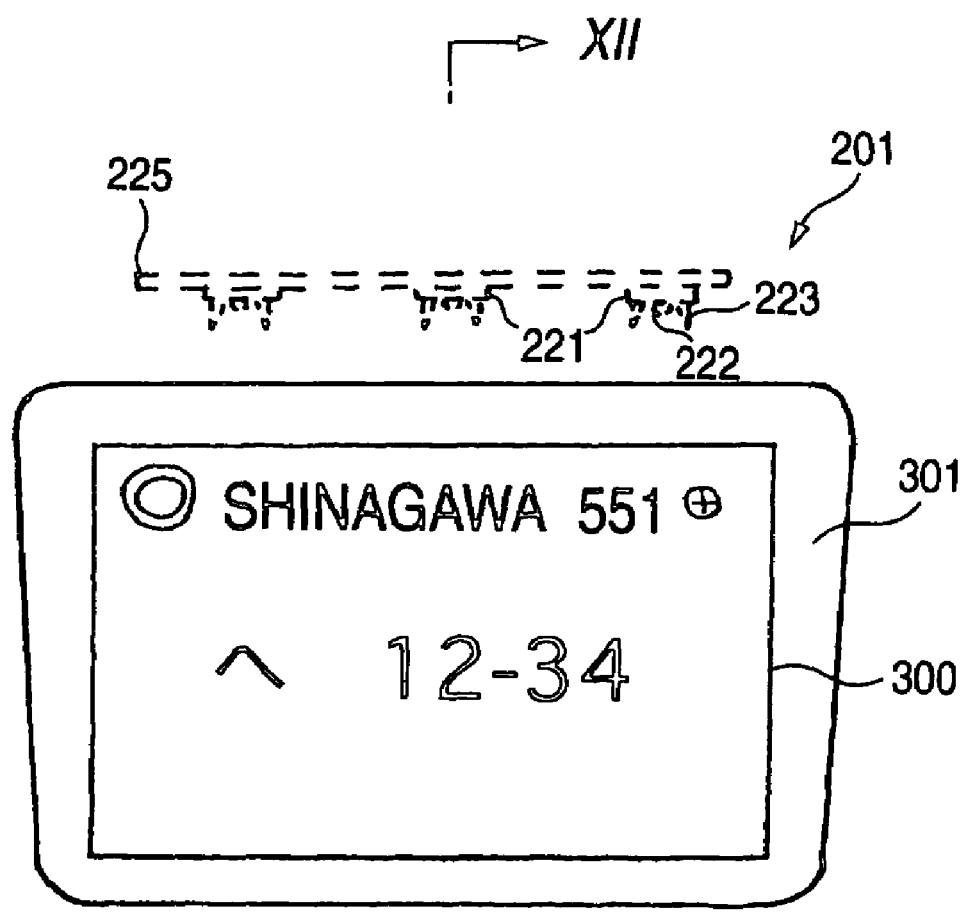
FIG. 11 is a front view showing the license plate illumination device 201.
Figure 12:
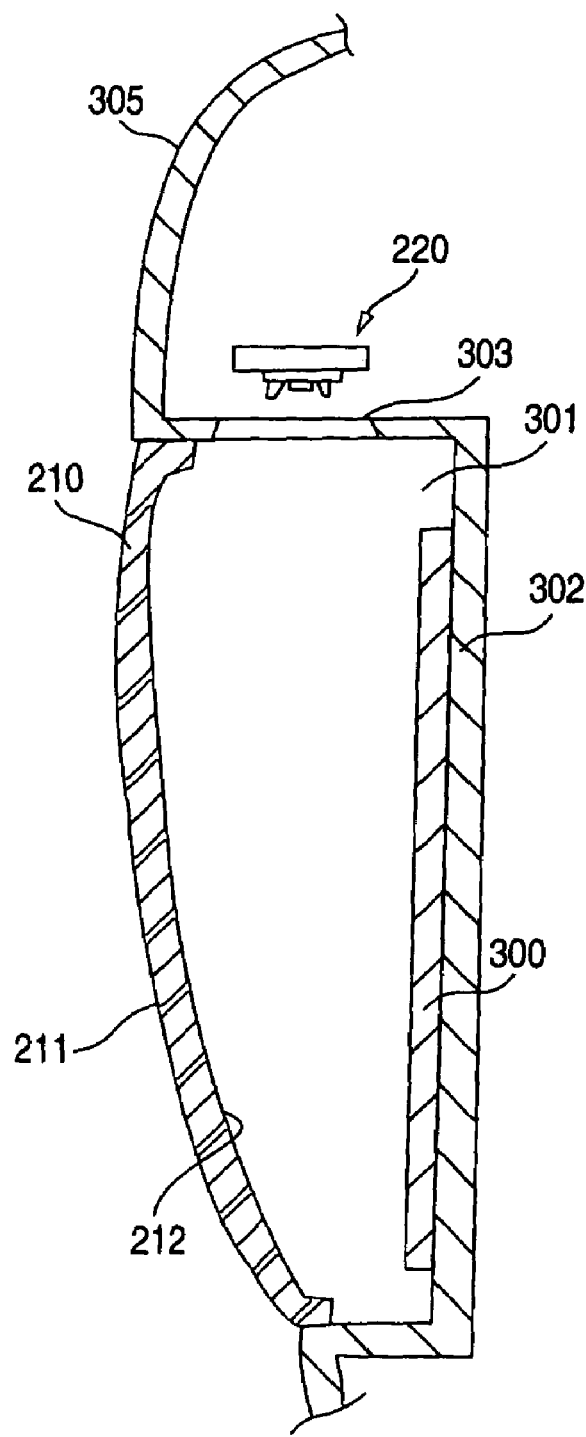
FIG. 12 is a sectional view taken along the line XII—XII in FIG. 11.

FIG. 11 is a front view showing a state in which the illumination device 201 is used. FIG. 12 is a sectional view taken along the line XII—XII in FIG. 11. The illumination device 201 is provided for a vehicle rear license plate and is arranged in the trunk lid 305 in the rear of the vehicle and the concave portion 301 provided to the rear of the vehicle. The illumination device 301 is provided with the reflector 210 and the LED unit 220.

Figure 13A:
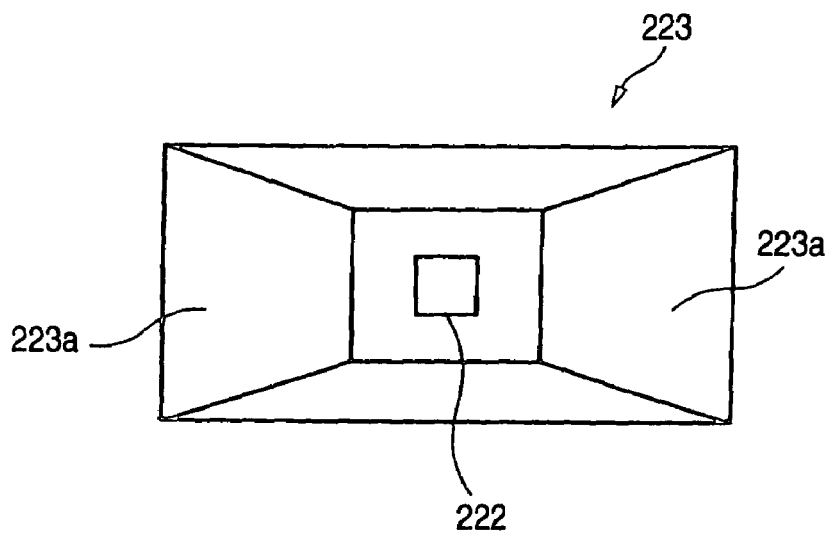
FIGS. 13A to 13C are views showing examples of an LED used in the invention.
Figure 13B:
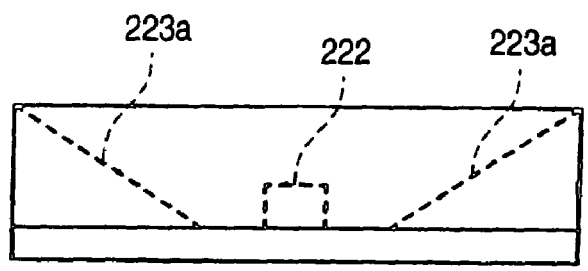
Figure 13C:
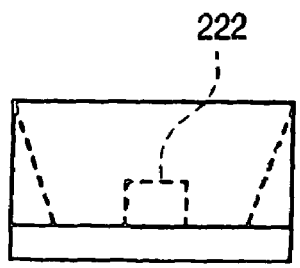

In the illumination device 201, the LED unit 220 is used. The LED unit 220 is provided with three LEDs 221 and a substrate 225. LED 221 is a chip type LED that emits white light. LED 221 is provided with a reflector 223 that encircles the transverse direction of an LED chip 222 by four faces (see FIGS. 13A to 13C). The tilt angles of the opposite faces of the reflector 223 are equal and in the meantime, the tilt angles of the adjacent faces are different. Each LED 221 is mounted on the substrate 225 so that a pair of faces 223a the tilt angles of which are smaller of its reflector 223 and the longitudinal axis (the transverse direction) of the rear license plate 300 are parallel when LED is used and as a result, wider light is radiated in the transverse direction than light in a lengthwise direction of the rear license plate 300 from LED 221. A protective resistor is mounted on the substrate 225 in addition to LED 220 and a wiring pattern in which each LED 221 is connected in series is formed.

The LED unit 220 is arranged inside the trunk lid 305 of the vehicle so that the LED unit lights the rear license plate arranged in the concave portion 301 provided to the trunk lid 305. A straight line tying each LED 221 built in the LED unit 220 is substantially parallel to the upper edge of the rear license plate 300. The LED unit 220 is arranged so that the optical axis X of each LED 221 passes a light source opening 303 in the concave portion 301 and is substantially parallel to the planar direction of the rear license plate 300 when the illumination device 201 is used.

The reflector 210 is attached so that it closes the concave portion 301 of the trunk lid 305 to prevent rainwater, dust and others from entering. The rear license plate 300 is arranged on a concave wall 302 in the concave portion 301.

The reflector 210 has a curved surface the curvature of which increases as distance from the LED unit 220 increases, that is, as the curved surface approaches a lower part of the rear license plate 300. Therefore, the reflector 210 has the curved surface that gradually approaches the lower part of the rear license plate 300. Owing to this contour, the light of the LED unit 220 radiated toward the reflector 210 is reflected to be light directed toward the center or the lower part of the rear license plate 300.

The reflector 210 is made of polycarbonate which is material that transmits light to enable viewing the rear license plate 300 irradiated by the LED unit 220 at the back of the vehicle.

Figure 14:
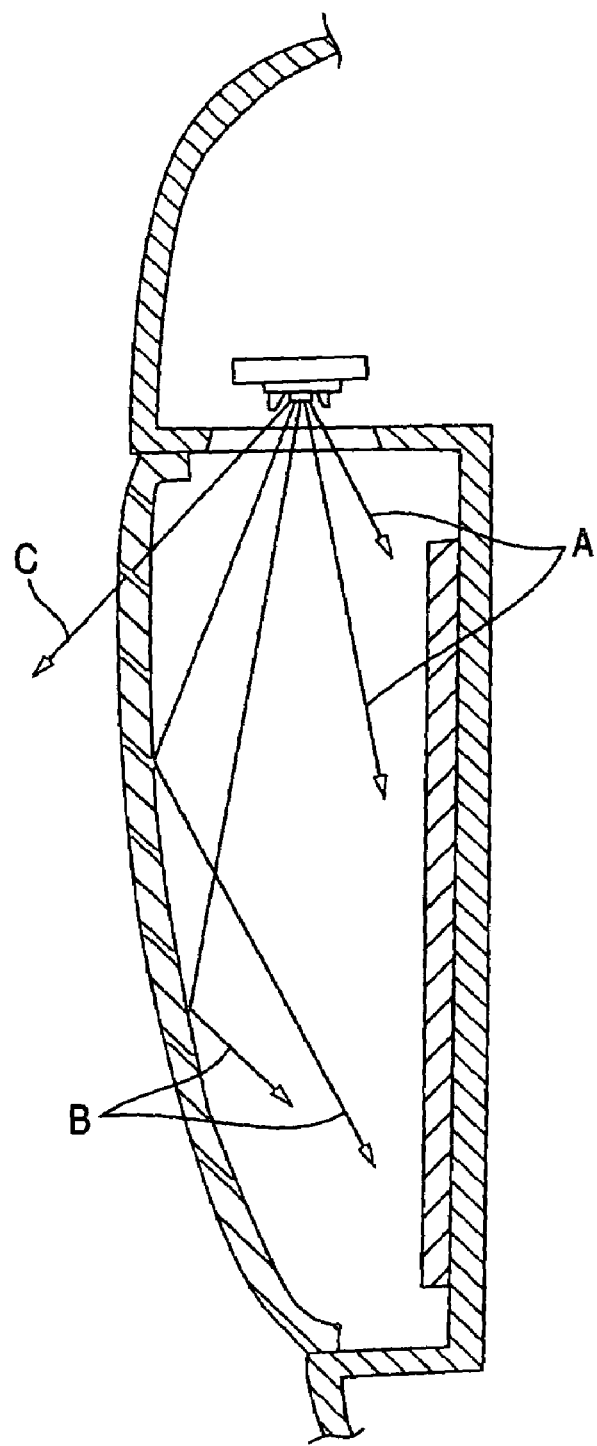
FIG. 14 shows an example of the behavior of radiated light.

Then, lighting by the illumination device 201 will be described. First, when the LED unit 220 is fed, each LED 221 is lit. Light radiated from LED 221 irradiates the rear license plate 300 after the light passes the light source opening 303. The radiated light is roughly classified into light that directly irradiates the rear license plate 300 (hereinafter called radiated light A), light reflected on the reflector 210 (hereinafter called radiated light B) and light refracted by the reflector 210 and radiated toward the back of the vehicle (hereinafter called radiated light C) as shown in FIG. 14.

The radiated light A irradiates an upper part to the lower part of the rear license plate 300, the illuminance of the upper part of the rear license plate 300 is higher because the illuminance increases as the radiated light is closer to the light source, and the illuminance of the lower part is low. Therefore, the irregularity of the radiation is caused on the rear license plate 300 by only the radiated light A. However, as light in the vicinity of the optical axis X including a large quantity of luminous energy is radiated toward the lower part of the rear license plate and light apart from the optical axis X and having relatively little luminous energy is radiated toward the upper part of the rear license plate because the optical axis X of LED 221 is substantially parallel to the planar direction of the rear license plate 300, a degree of the irregularity of radiation is inhibited.

In the meantime, the radiated light B is reflected on the reflector 210 and is directed toward the rear license plate 300 when the incidence angle of light incident on the reflector 210 from LED 221 exceeds the critical angle of the reflector 210. As the radiated light B is once reflected on the reflector 210, the most reaches the center and the lower part of the rear license plate 300 and irradiates the plate. Therefore, though the irregularity of illuminance is caused by only the radiated light A, the irregularity of radiation is solved by supplementing the radiated light B directed toward the lower part of the rear license plate 300 and radiated light toward the rear license plate 300 is uniformed.

The radiated light C is light refracted by the reflector 210 and radiated toward the back of the vehicle when the incidence angle of light incident on the reflector 210 from LED 221 is smaller than the critical angle of the reflector 210 and is loss for lighting for the rear license plate 300. However, as incident light the incidence angle of which is not sufficient is light apart from the optical axis of LED 221, it has relatively little luminous energy and the loss can be reduced.

In the above-mentioned illumination device 201, light having a high-speed luminous flux out of light radiated from LED 220 is utilized for the lighting of the center to the lower part of the license plate. Hereby, luminous energy radiated toward the upper part of the rear license plate 300 which light from LED 221 easily reaches because the upper part is close to LED 221 is inhibited and the center to the lower part of the rear license plate 300 which is difficult for light to reach because the center to the lower part is apart from LED 221 is positively lighted. In addition, illuminance in the center to the lower part of the rear license plate 300 is captured by the action of the reflector 210. Besides, light generated thereby (reflected light) because the reflector 210 has the above-mentioned curved surface is satisfactorily distributed to the center to the lower part of the rear license plate 300. The illuminance of the whole rear license plate 300 is uniformed in the combination of the above-mentioned actions and the irregularity of illuminance is reduced.

In the meantime, the light is effectively utilized by the reflector 210. That is, the utilization factor of light is enhanced by providing the reflector 210 and light having high illuminance is acquired.

The conventional type license plate is tilt for the light source to light the lower part of the plate, however, in the illumination device 201, as radiated light reaches the lower part of the rear license plate 300 by the action of the reflector 210, the rear license plate can be arranged substantially in parallel to the optical axis. Hereby, the whole illumination device 201 can be thinned, the trunk lid 305 can be thinned, and the larger housing space of a trunk can be secured.

As wide light in the transverse direction of the rear license plate 300 is radiated from each LED 221 to correspond to the rear license plate 300 longer in the transverse direction than in the lengthwise direction, the whole rear license plate 300 can be lighted by LEDs of a smaller number and simultaneously, the irregularity of the illuminance in the transverse direction of the rear license plate 300 is reduced.

Figure 15:
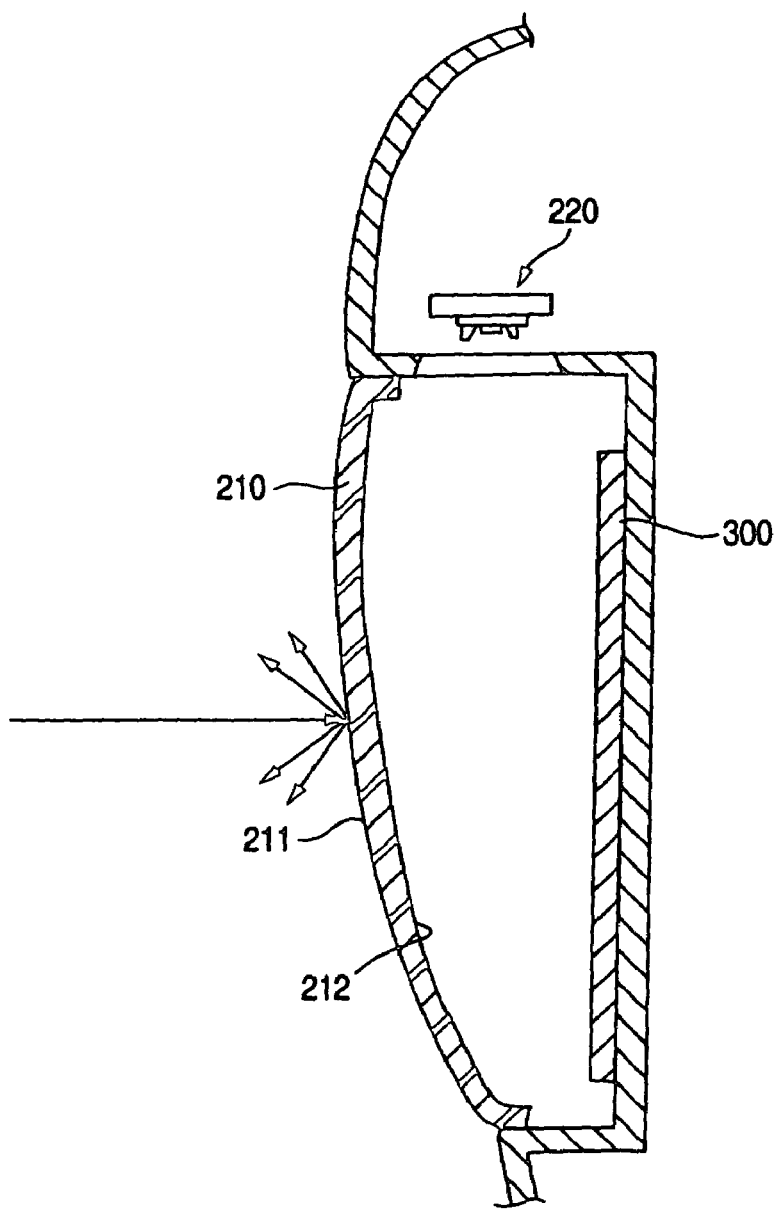
FIG. 15 shows that a light from a following vehicle is diffused.

In the meantime, light reflected toward occupants in a following vehicle is extremely little by making the observation face 211 of the reflector 210 a tertiary curved surface as shown in FIG. 15 even if headlight of the following vehicle is incident. Therefore, in such a case, the visibility of the license plate 300 is also sufficiently secured and the driving of the following vehicle is never disturbed by reflected light. Further, as the reflector 210 has high transparency, characters and numerals on the license plate 300 are satisfactorily visible both in lighting and in an unlighted state in the daytime (when LED 221 is unlighted).

In the meantime, as the observation face 211 of the reflector 210 is glossy, the design and visibility of the license plate lighted by the reflector are enhanced though it is natural that the design of the reflector 210 itself is made excellent.

(Fourth Embodiment)

Figure 16:
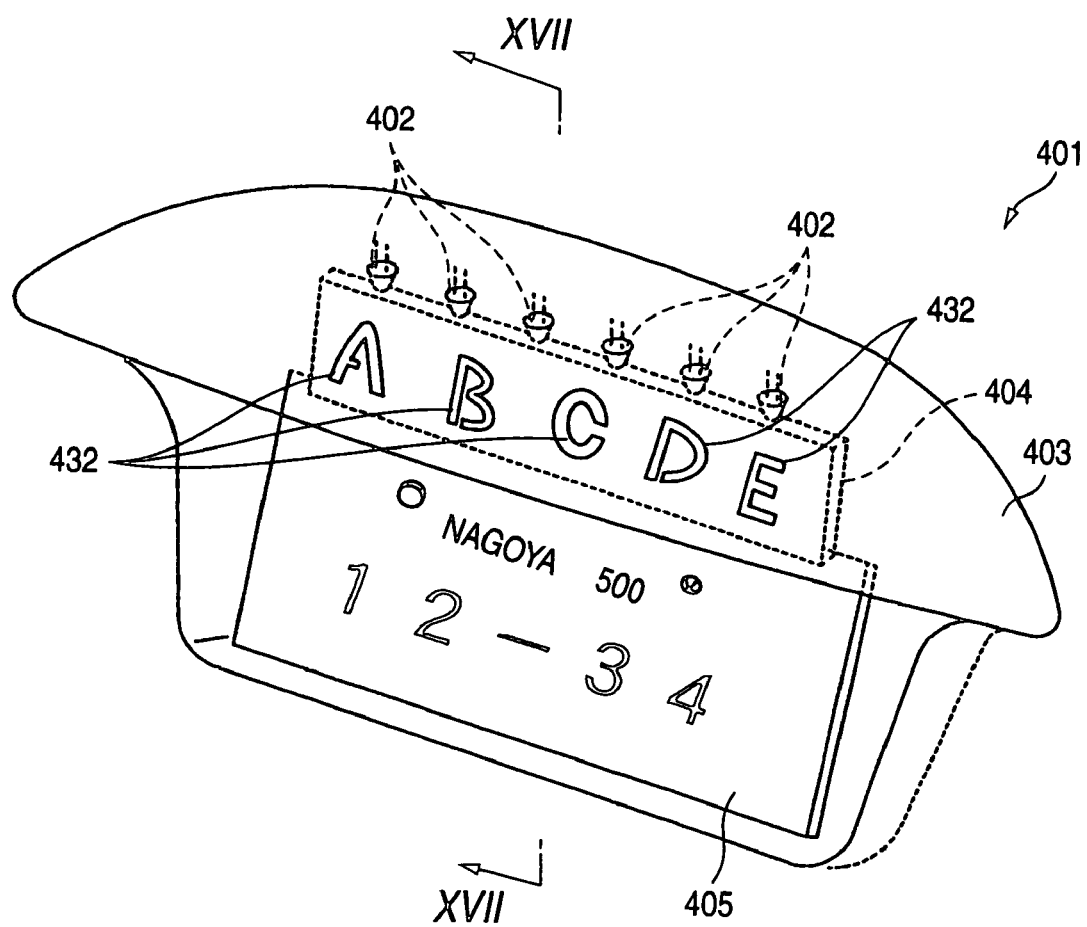
FIG. 16 is a perspective view showing a rear license plate portion of a vehicle to which a illumination device 401 according to a fourth embodiment of the invention is attached.
Figure 17:
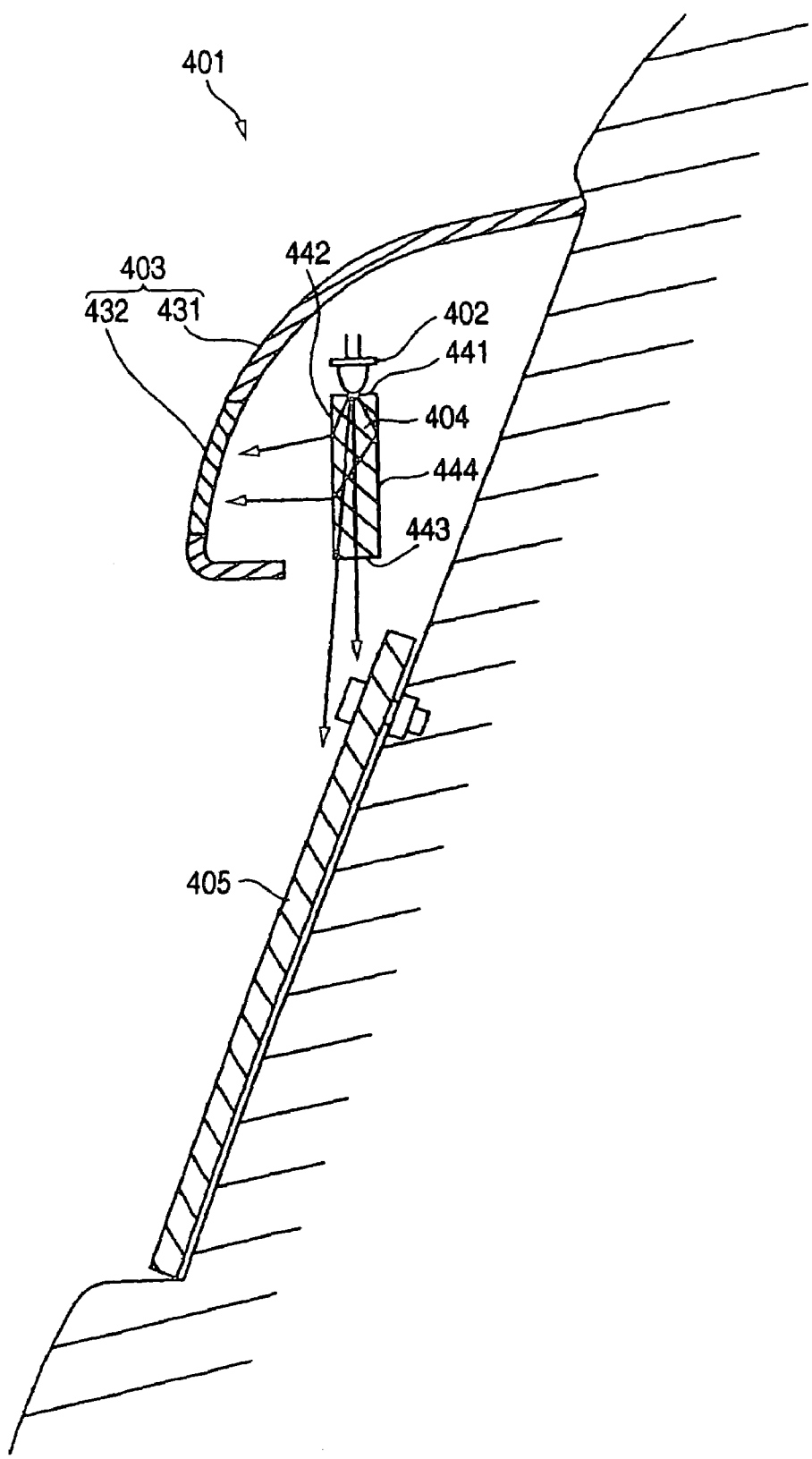
FIG. 17 is a sectional view taken on line XVII—XVII in FIG. 16.

FIG. 16 is a perspective view showing a state in which a illumination device for a vehicle 401 (hereinafter called as "illumination device 401") according to a fourth embodiment of the invention is used. FIG. 17 is a sectional view taken on line XVII—XVII in FIG. 16. The illumination device 401 includes six LEDs 402 which are used as the light source. LED 402 is a lamp type white LED. Six LEDs 402 are arranged at regular intervals being opposed to an upper end face of the light guiding member 404 described later. These LED 402 are mounted on a substrate not shown in the drawing. On a surface of the substrate, a wiring pattern and electric wires for the power source not shown are formed. Electric power is supplied to LED 402 through the wiring pattern and others. Through the control lines not shown, the lighting of LED 402 is controlled by the controller not shown.

The illumination device 401 includes the light guiding member 404 which is a spectral member. The light guiding member 4 is made of a transparent acrylic resin. The light guiding member 404 is formed into a plate shape, and the width of the light guiding member 404 is substantially the same as the width of the license plate 405. The light guiding member 404 is arranged along an upper side of the license plate 405. An upper end face of the light guiding member 404 is opposed to LED 402. Therefore, the upper end face of the light guiding member 404 becomes the light incident face 441 upon which the light of LED 402 is incident. A lower end face of the light guiding member 404, which is opposed to the license plate 405, becomes the first light emitting face 443. A face of the light guiding member 404 on the side of the vehicle body is vapor-deposited by aluminum. On the other hand, an opposite face of the reflecting face 444 of the light guiding member becomes the second light emitting face 442. In this connection, the surface of the light guiding member 404 except for the light incident face 441, the first light emitting face 443 and a portion of the second light emitting face 442, which corresponds to the garnish light transmission portion 432 (described later), is vapor-deposited by aluminum.

LED 402 and the light guiding member 404 composed as described above are accommodated in the garnish 403. The garnish 403 includes a garnish body portion 431 and a garnish light transmission portion 432. The garnish body portion 431 is made of ABS, and the garnish light transmission portion 432 is made of a transparent acrylic resin. In the plan view, the light transmission portion 432 models after desired letters (letters of ABCDE in this embodiment). A lower portion of the garnish 403 is open so that the light emitted from the first light emitting face 443 of the light guiding member 404 can be irradiated onto the license plate 405.

Then, the lighting embodiment of the illumination device 401 will be explained below. First, while being linked with the lighting of the small lamps, LED 402 is turned on. Light emitted from LED 402 is introduced into the light guiding member 404 via the light incident face 441. A portion of the introduced light is directly reflected on the light guiding member 404 or repeatedly reflected in the light guiding member 404 and then emitted from the first light emitting face 443. Light emitted from the first light emitting face 443 is irradiated on the license plate 405. On the other hand, a portion of the light introduced into the light guiding member 404 is emitted from the second light emitting face 442. Light emitted from the second light emitting face 442 is irradiated onto an inner surface of the garnish light transmission portion 432. The thus irradiated light is emitted from an outer surface, transmitting through the garnish light transmission portion 432. Therefore, when an observation is made from the outside, the garnish light transmission portion can be seen as if it emitted light. Due to the foregoing, desired letters are displayed by the emitted light, and the design of the license plate portion can be enhanced.

In this connection, since a portion on the second light emitting face 442 except for a portion corresponding to the garnish light transmission portion 432 is vapor-deposited by aluminum, only the light necessary for emitting light from the garnish light transmission portion 432 is emitted from the second light emitting face 442. As a result, most of the light introduced into the light guiding member 404 is emitted from the first light emitting face 443. Therefore, the license plate 405 can be effectively lit.

In this case, in the lighting of the license plate 405 conducted by the light emitted from the first light emitting face 443, the more distant from LED 402 the region is, the lower the lighting intensity is reduced. Accordingly, it is preferable that much light is irradiated in a lower portion of the license plate which is distant from LED 402. Therefore, when the reflecting face 444 of the light guiding member is made to be parallel with the optical axes of LED 402, it is possible to positively emit light from the first light emitting face 443 while light is being moderately emitted. In this embodiment, the shape of the first light emitting face 443 is a plane substantially parallel with the light incident face 441. However, the shape of the first light emitting face 443 can be appropriately determined so that the license plate 405 can be excellently lit when consideration is given to a position of the license plate 405.

As described above, in the illumination device 401, since both the license plate 405 and the garnish light transmission portion 432 are irradiated with the light emitted from LED 402, it is unnecessary to provide the light source for each of the license plate 405 and the garnish light transmission portion 432. Accordingly, a space in which the light source is arranged can be reduced. In addition to that, the number of parts can be decreased. Therefore, the working efficiency for attaching the illumination device can be enhanced.

In this case, the light guiding member reflecting face 444 of the light guiding member 404 may be tapered so that the light guiding member reflecting face 444 can approach the second light emitting face 442 in a region from the light incident face 441 to the first light emitting face 443. Due to the above structure, light introduced into the light guiding member 404 can be positively reflected in the direction of the second light emitting face 442. Further, in the region distant from LED 402, the light guiding member reflecting face 444 comes close to the optical axes of LED 402. Therefore, a quantity of the received light on the light guiding member reflecting face 444 can be entirely averaged. As a result, light can be emitted from the garnish light transmission portion 432 while irregularity of the luminous intensity is being suppressed low.

The second light emitting face 442 may be colored with an arbitrary color by a coloring agent having a light transmission property. Alternatively, a surface of the garnish light transmission portion 432 may be colored by a coloring agent of an arbitrary color having a light transmission property. Due to the foregoing, letters formed in the garnish light transmission portion 432 can be brightened by an arbitrary color. Therefore, the design of the license plate portion can be more enhanced.

Diffusion treatment may be conducted on a surface of the garnish light transmission portion 432. Concerning the diffusion treatment, it is possible to adopt a well known method of forming wrinkles. Alternatively, light diffusion material can be contained in the garnish light transmission portion 432. Concerning the light diffusion material, a well known material such as silica or metal of aluminum can be adopted. Due to the foregoing, luminance of the light emitted outside from the garnish light transmission portion 432 can be made uniform.

(Fifth Embodiment)

Figure 18:
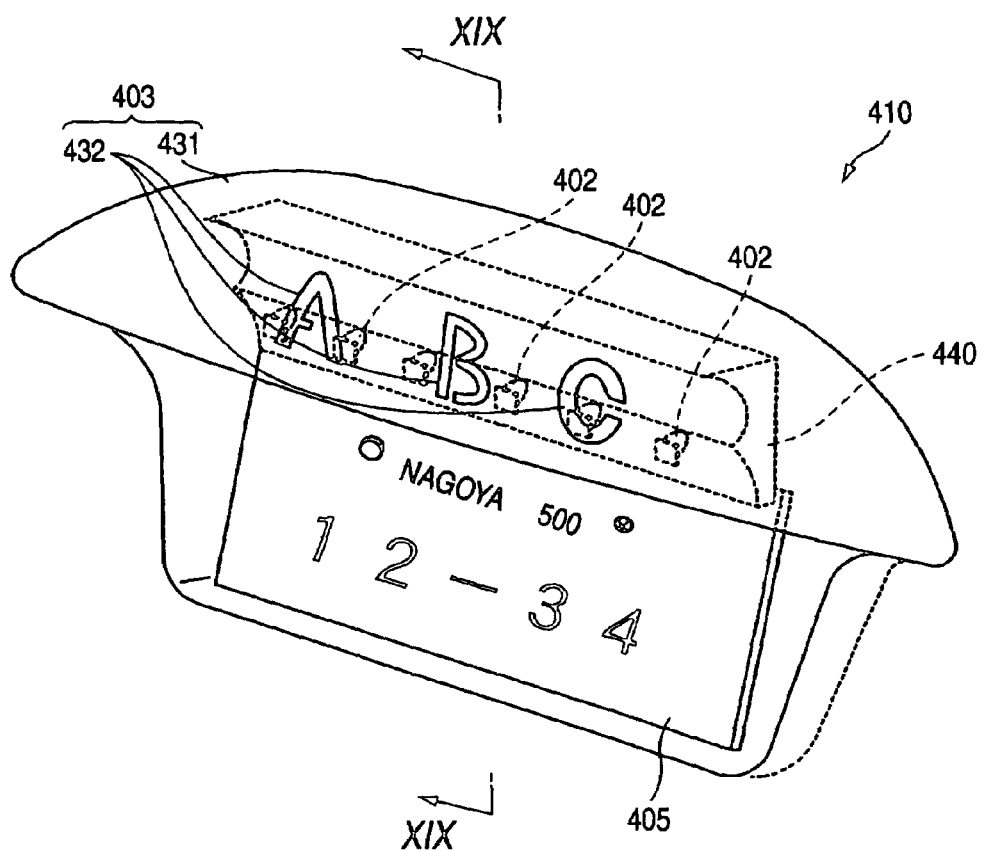
FIG. 18 is a perspective view showing a illumination device 410 according to a fifth embodiment of the invention.
Figure 19:
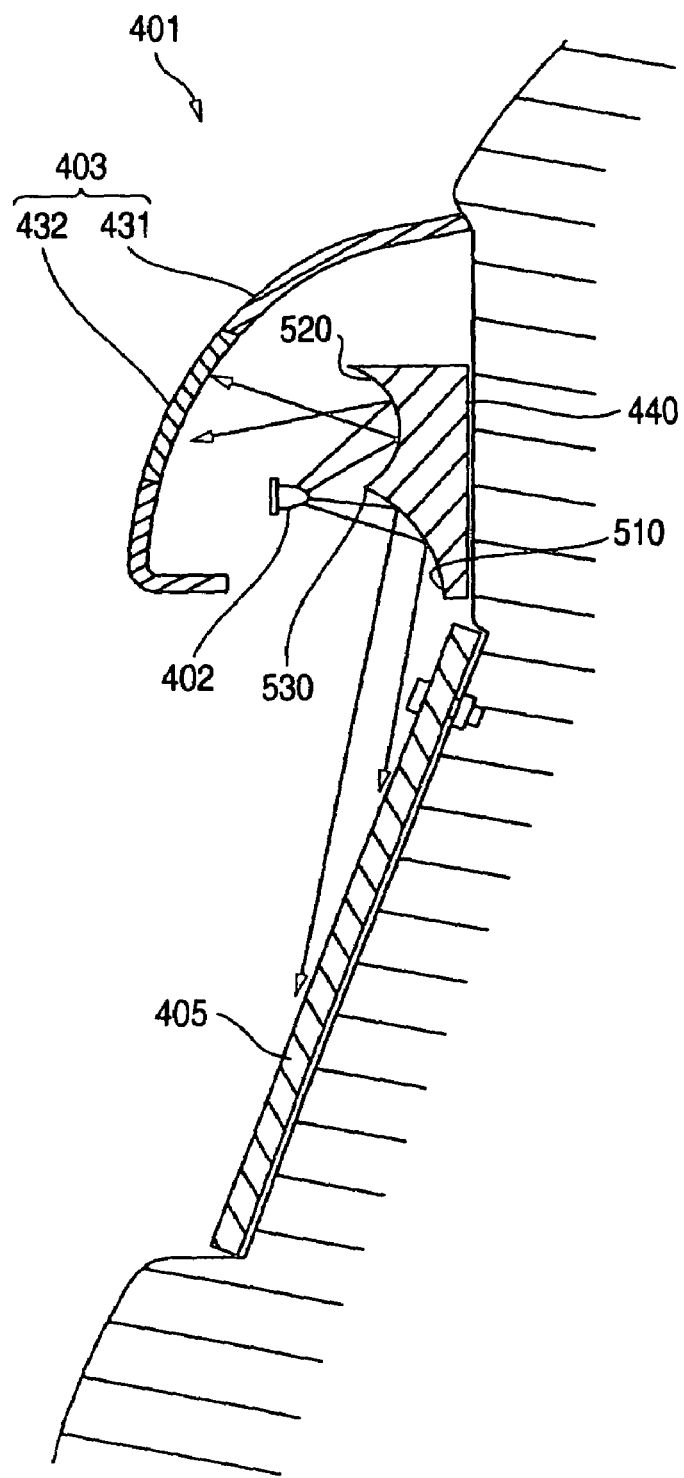
FIG. 19 is a sectional view taken along the line XIX—XIX in FIG. 18.
Figure 20:
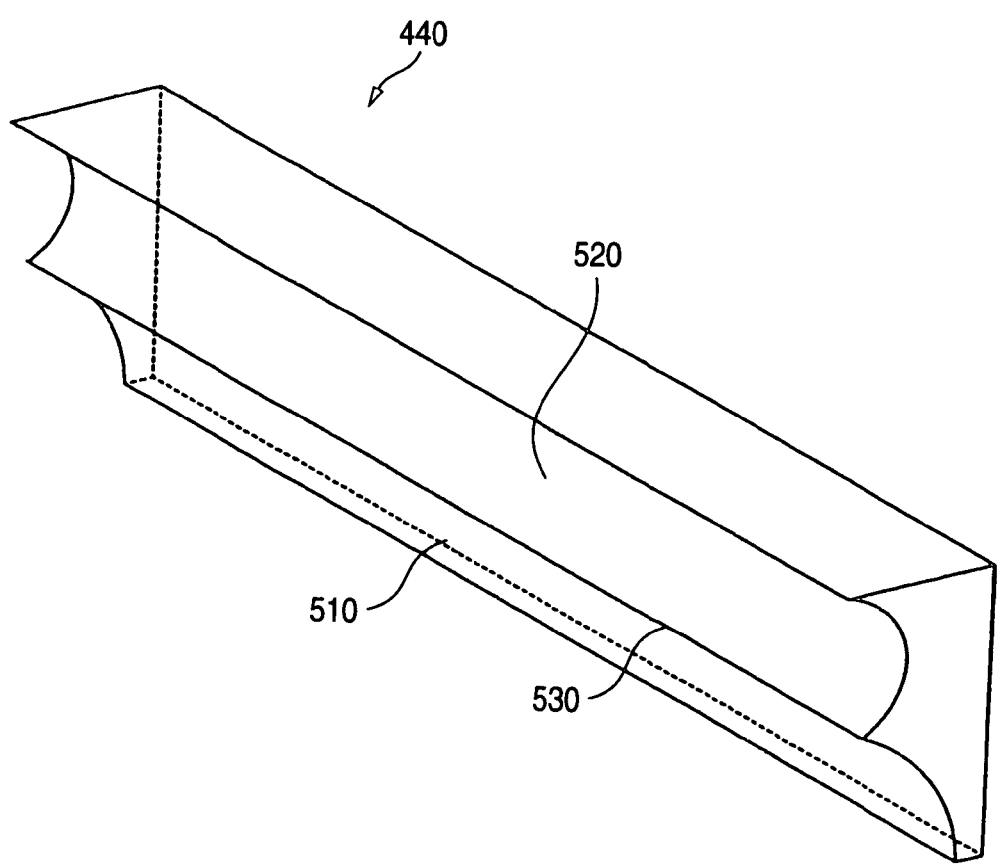
FIG. 20 is a perspective view showing a spectral member 440 of a illumination device 410.

FIG. 18 is a perspective view showing a state in which a illumination device for a vehicle 410 (hereinafter called as "illumination device 410") according to a fifth embodiment of the invention is used. FIG. 19 is a sectional view taken on line XIX—XIX in FIG. 18. FIG. 20 is a perspective view showing a reflecting member 440. In the following explanations, the same reference characters are used to indicate the same parts as those of the above illumination device 401, and the explanations of the same parts are omitted here.

The illumination device 410 includes six LEDs 402. LED 402 is arranged so that the emitted light of LED 402 can be directed to the vehicle body side. The illumination device 410 further includes a spectral member 440. The shape of the spectral member 440 in the length direction (the traverse direction) is uniform. The spectral member 440 includes a first reflecting face 510 at a lower portion on the garnish 403 side and a second reflecting face 520 at an upper portion on the garnish 403 side. The first reflecting face and the second reflecting face are respectively formed into a concave. In this embodiment, cross sections of the first reflecting face and the second reflecting face are respectively comprised of one portion of a parabola. In this connection, an upper end of the first reflecting face 510 and a lower end of the second reflecting face 520 are connected with each other at the boundary portion 530. The first reflecting face 510 reflects the received light, which has been emitted from LED 402, in the direction of the license plate 405, and the second reflecting face 520 reflects the received light, which has been emitted from LED 402, in the direction of the garnish light transmission portion 432. In this connection, aluminum vapor-deposition is conducted on the surfaces of the first reflecting face 510 and the second reflecting face 520. The spectral member 440 is arranged between LED 402 and the vehicle body so that the boundary portion 530 of the spectral member 440 can be positioned on the optical axes of LED 402.

Then, the lighting embodiment of the illumination device 410 will be explained below. A portion of the light emitted from LED 402 is irradiated on the first reflecting face 510 and reflected in the direction of the license plate 405 so that the license plate 405 can be lit. On the other hand, another portion is of the light emitted from LED 402 is irradiated on the second reflecting face 520 and reflected in the direction of the garnish light transmission portion 432 so that the light can be emitted outside from the garnish light transmission portion 432. As described above, in the illumination device 410, both the license plate 405 and the garnish light transmission portion 432 can be simultaneously irradiated with the light emitted from LED 402. That is, the same light source can be used for both the license plate and the garnish light transmission portion. Therefore, a space in which the light source is arranged can be reduced. Further, the number of parts can be decreased, and the attaching work can be easily performed. Since the first reflecting face 510 and the second reflecting face 520 are composed being integrated into one body by the spectral member 440, the number of parts can be further decreased, and the production cost can be reduced and the working efficiency can be enhanced.

Figure 21:
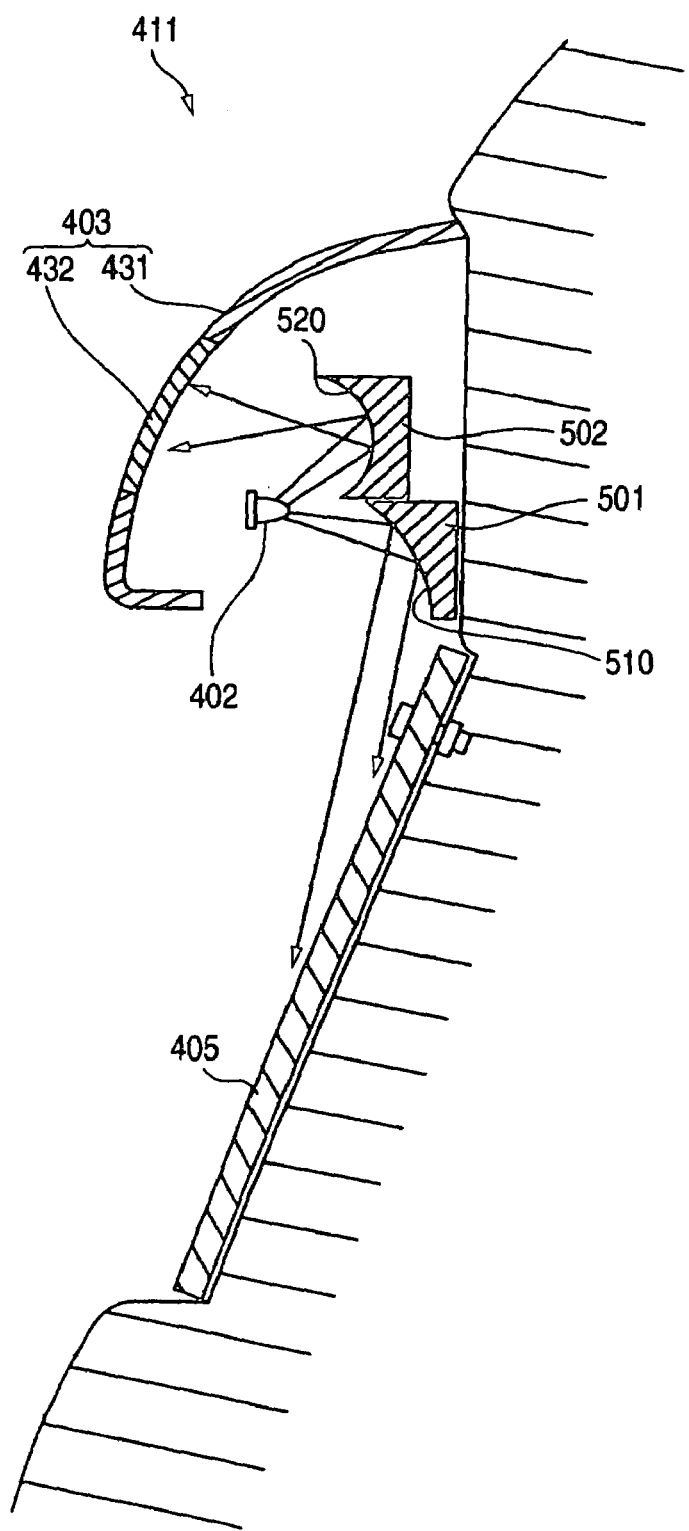
FIG. 21 is a longitudinally sectional view of a illumination device 411 of another embodiment of the invention.

In the illumination device 410, the first reflecting face 510 and the second reflecting face 520 are composed being integrated with each other into one body, however, the first reflecting face 510 and the second reflecting face 520 may be individually, independently provided. For example, as shown in FIG. 21, the illumination device includes a spectral member 501 having a first reflecting face 510 and a spectral member 502 having a second reflecting face 520. The first reflecting face 510 of the spectral member 501 is opposed to LED 402, and an upper end of the first reflecting face 510 is positioned on the optical axis of LED 402. On the other hand, the second reflecting face 520 of the spectral member 502 is opposed to LED 402, and a lower end of the second reflecting face 520 is positioned on the optical axis of LED 402. In the illumination device of the above configuration, positions of the first reflecting face 510 and the second reflecting face 520 can be respectively set. Accordingly, an adjustment can be easily made so that the license plate 405 and the garnish light transmission portion 432 can be made to emit light excellently.

(Sixth Embodiment)

Figure 22:
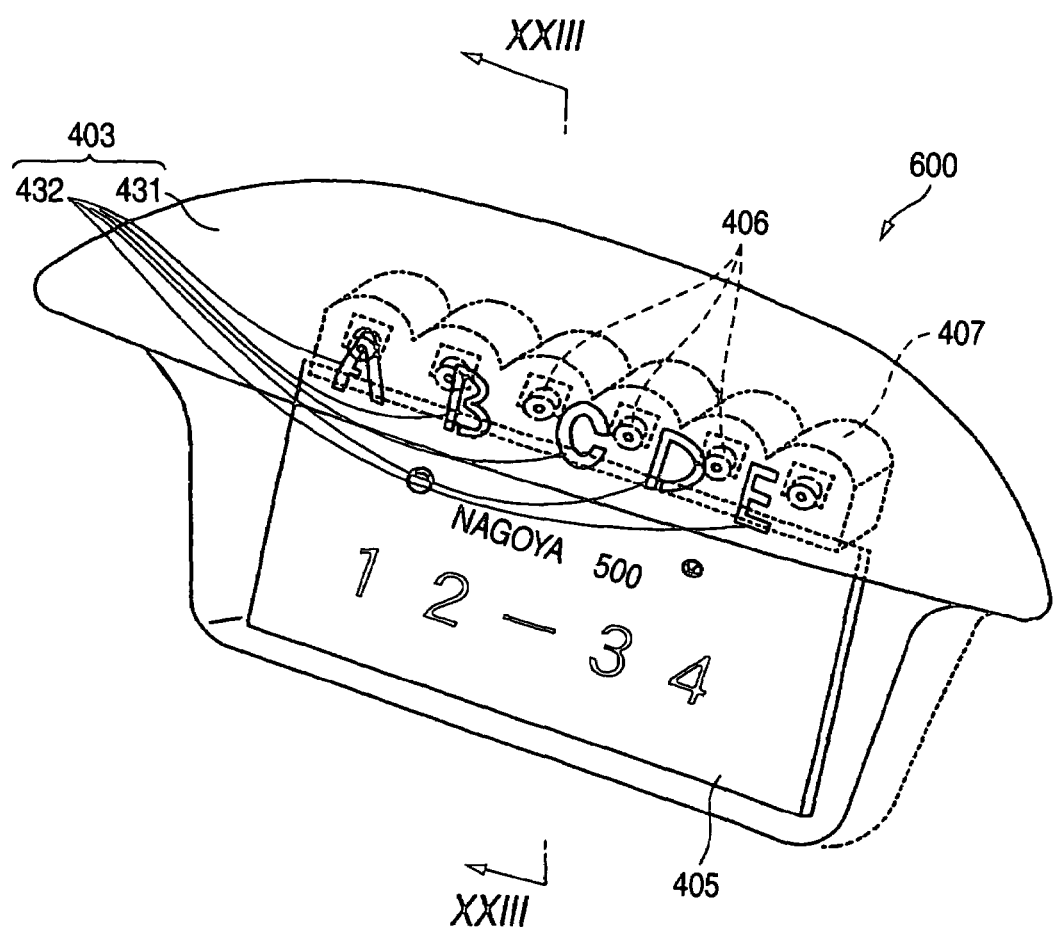
FIG. 22 is a perspective view showing a illumination device 600 according to a sixth embodiment of the invention.
Figure 23:
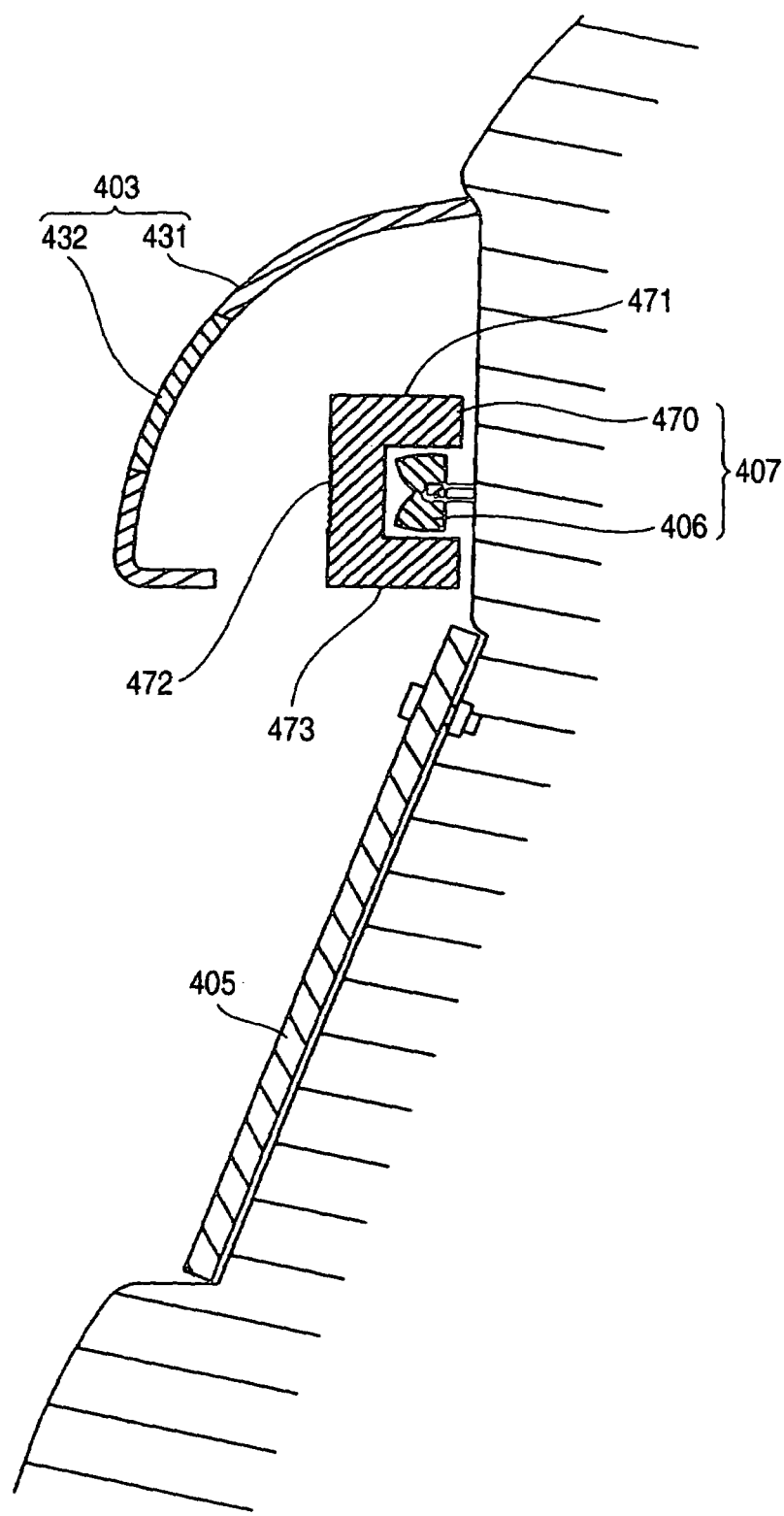
FIG. 23 is a sectional view taken along the line XXIII—XXIII in FIG. 22.
Figure 24:
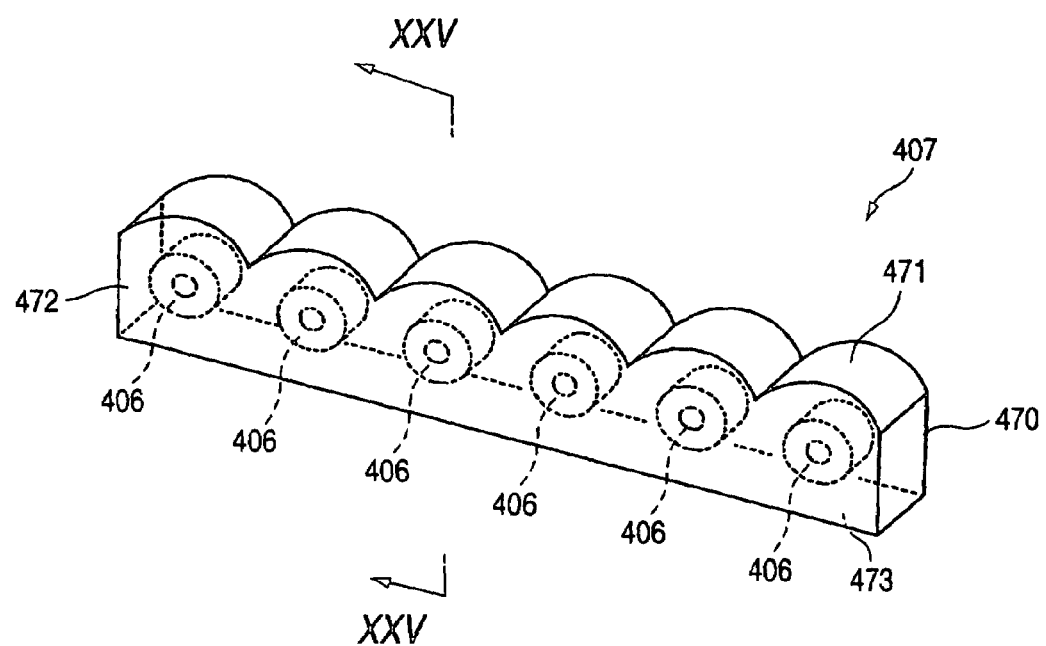
FIG. 24 is a perspective view showing a lamp assembly 407 in a illumination device 600.
Figure 25:
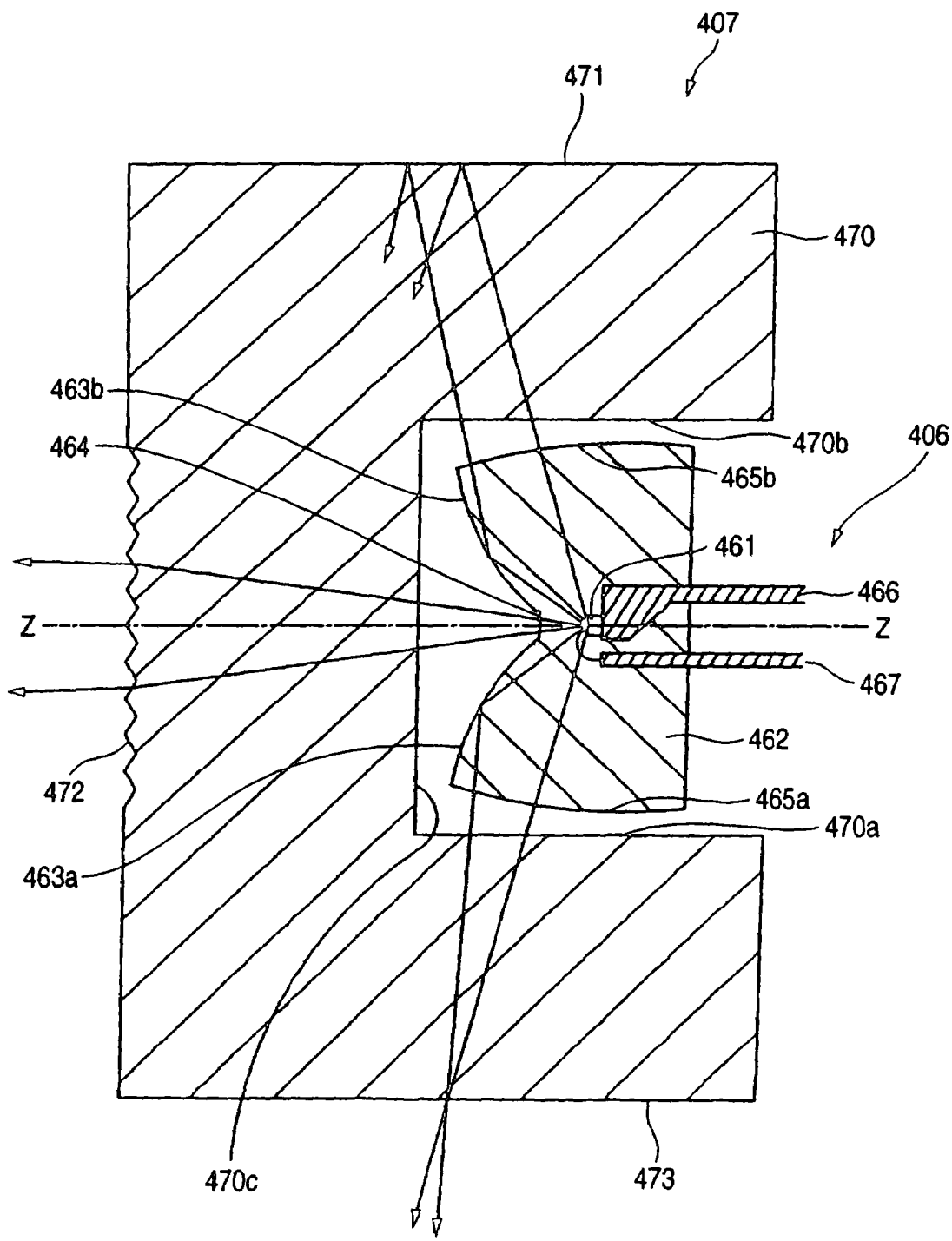
FIG. 25 is a sectional view taken along the line XXV—XXV in FIG. 24.

FIG. 22 is a perspective view showing a state in which a illumination device 600 for a vehicle (hereafter called as "illumination device 600") according to a sixth embodiment of the invention is used. FIG. 23 is a sectional view taken on line XXIII—XXIII in FIG. 22. FIG. 24 is an enlarged view of the light source. FIG. 25 is a sectional view taken on line XXV—XXV in FIG. 24. In the following explanations, the same reference characters are used to indicate the same parts as those of the above illumination devices 401 and 410, and the explanations of the same parts are omitted here.

In the illumination device 600, the lamp assembly 407 having six LEDs 406 is accommodated in the garnish 403. On the longitudinal cross section of LED 406 shown in FIG. 25, axis Z—Z is a straight line which passes through the center of the light emitting element 461 and is parallel with the optical axis of the light emitted from the light emitting element 461. The light emitting element 461 mounted on the lead frame 466 is wire-bonded to the lead frame 467 and sealed by the sealing member 462 made of epoxy resin. LED 406 includes upper face reflecting faces 463a, 463b and a central emitting face 464 on an upper face side of the light emitting element 461 of the sealing member 462 LED 406 further includes side emitting faces 465a, 465b on the side of the light emitting element 461. The upper face reflecting faces 463a, 463b are formed into a shape obtained when a parabola is rotated round axis Z—Z, the focus of which is an upper face central portion of the light emitting element 461, the symmetrical axis of which is perpendicular to axis Z—Z. The central emitting face 464 is formed into a circular shape contained in the plane substantially perpendicular to axis Z—Z. The side emitting faces 465a, 465b are formed into a cylindrical face shape substantially parallel with axis Z—Z and slightly tapered from the lower portion to the upper portion of LED 406. LED 406 are mounted on the substrate not shown in the drawing. On a surface of the substrate, the wiring pattern and the wires for the power source are formed. Electric power is supplied to LED 406 through the wiring pattern and others. On the substrate, elements (not shown) such as a protective resistor are arranged.

The lamp assembly 407 includes six LEDs 406 and a light guiding member 470 made of acrylic resin having a light transmission property. The six LEDs 406 are arranged at regular intervals, and the light guiding member 470 covers the upper reflecting faces 463a, 463b, the central emitting face 464 and the side emitting faces 465a, 465b of each LED 406 as shown in FIG. 25. The light guiding member 470 includes faces (light incident faces 470a, 470b, 470c) opposed to LED 406, an upper face (a reflector face 471), a lower face (a first light emitting face 473), and a face (a second light emitting face 472) for irradiating light emitted from the central emitting face 464 of LED 406. The light incident faces 470a, 470b are formed into a shape that lies along the shape of the side emitting face 465b of LED 406, and the light incident face 470c is formed into a circular shape included on a plane substantially perpendicular to the optical axis of LED 406. The reflector face 471 is a light reflecting face, on which aluminum is vapor-deposited, and formed into a shape which substantially lies along the side emitting face 465b of LED 406. Light emitted from LED 406 and received by the reflector face 471 is reflected to the side of the first light emitting face 473. Wrinkles are formed on the second light emitting face 472 so that light diffusion treatment can be conducted. The lamp assembly 407 is arranged substantially along an upper end of the license plate 405 so that the light of LED 406 emitted from the first light emitting face 473 can be irradiated on the license plate 405 and the light of LED 406 emitted from the second light emitting face 472 can be irradiated on the garnish light transmission portion 432.

A lighting embodiment of the illumination device 600 will be explained below. A portion of the light emitted from the light emitting element 461 is reflected by the upper face reflecting face 463a in the direction substantially perpendicular to the optical axis of the light emitting element 461. The thus reflected light is emitted from the side emitting face 465a and introduced into the light guiding member 470 from the light incident face 470a. On the other hand, light of the light emitting element 461 directly proceeding in the direction of the side emitting face 465a is emitted from the side emitting face 465a and introduced into the light guiding member 470 from the light incident face 470a. As described above, light introduced into the light guiding member 470 is guided in the light guiding member 470, and then a portion of the guided light is emitted from the first light emitting face 473, so that the license plate 405 can be lit. On the other hand, light of LED 406 reflected on the upper face emitting face 463b is emitted from the side emitting face 465b and introduced into the light guiding member 470 from the light incident face 470b On the other hand, light of the light emitting element 461, which is directly proceeding in the direction of the side emitting face 465b, is emitted from the side emitting face 465b and introduced into the light guiding member 470 from the light incident face 470b. The thus guided light is irradiated on the reflector 471 and reflected on the reflector face 471 in the direction of the first light emitting face 473 and emitted from the first light emitting face 473 so as to light the license plate 405. Further, another portion of the light emitted from the light emitting element 461 is emitted from the central emitting face 464 in the direction substantially parallel with the optical axis of the light emitting element 461 and introduced into the light guiding member 470 from the light incident face 470c The thus introduced light is irradiated from the second light emitting face 472 to the garnish light transmission portion 432 and emitted outside. As described above, in the illumination device 600, a light for lighting the license plate 405 and a light for irradiating the garnish light transmission portion 432 are simultaneously generated by the upper face reflecting faces 463a, 463b and the central emitting face 464 which are provided in the sealing member 462 of LED 406.

Accordingly, in the illumination device 600, it is unnecessary to specially provide a spectral member. Therefore, a space in which the illumination device 600 is arranged can be reduced. Further, since the number of parts is small, the attaching work can be easily performed.

In this case, a surface of the second light emitting face 472 of the lamp assembly 407 of the illumination device 600 may be coated with a coloring agent having a light transmission property of an arbitrary color. Alternatively, the resin composing the second light emitting face 472 may contain a coloring agent. Due to the foregoing, the color of light emitted from the garnish light transmission portion 432 can be changed to an arbitrary color. Therefore, the decoration property of the illumination device 600 can be more enhanced. Wrinkles are formed on the surface of the second light emitting face 472 as a light diffusion treatment, however, a light diffusion material may be used as a light diffusion treatment. That is, the resin composing the second light emitting face 472 may contain a light diffusion material. Concerning the light diffusion material, it is possible to use a well known material such as silica, glass or metal of aluminum having a predetermined grain size. When the second light emitting face 472 is subjected to a light diffusion treatment, luminance of the light emitted outside from the garnish light transmission portion 432 can be made uniform. Therefore, letters forming the garnish light transmission portion 432 can be more clearly observed, and the design of the license plate portion can be enhanced.

Figure 26:
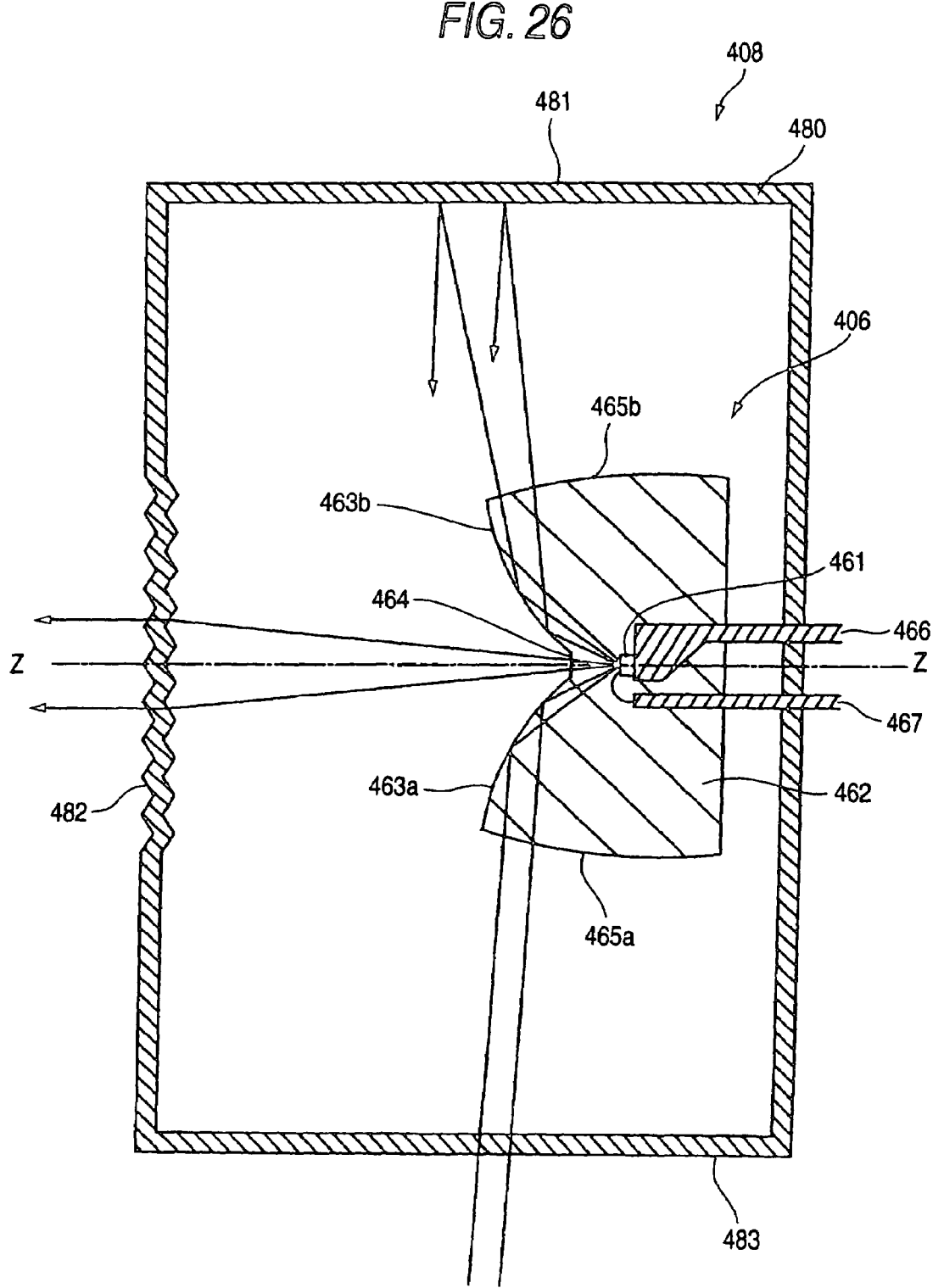
FIG. 26 is a longitudinally sectional view of a lamp assembly 408 of a illumination device of another embodiment of the invention.

In the above illumination device 600, a light for lighting the license plate 405 and a light for irradiating the garnish light transmission portion 432 are simultaneously generated by using the lamp assembly 407. However, when the lamp assembly 408 shown in FIG. 26 is used, the two types of beams of light can be generated in the same manner. In this configuration, the lamp assembly 408 includes a substantially rectangular prism-shaped casing 480 made of acrylic resin having a light transmission property. This casing 480 includes an upper face (a reflector face 481), a lower face (a first light transmission face 483), and a face (a second light transmission face 482) on which the light emitted from the central emitting face 464 of LED 406 is irradiated. LED 406 are arranged at regular intervals inside the casing 480, and the optical axes of the light emitting elements 461 are substantially perpendicular to the second light transmission face 482. The reflector face 481 is a light reflecting face, on which aluminum is vapor-deposited, and formed into a shape which substantially lies along the side emitting face 465*b* of LED 406. Light emitted from LED 406 and received by the reflector face 481 is reflected to the side of the first light transmission face 483. Wrinkles are formed on the second light transmission face 482 as a light diffusion treatment. The lamp assembly 408 is arranged substantially along an upper end of the license plate 405 so that the light of LED 406 emitted from the first light transmission face 483 can be irradiated on the license plate 405 and the light of LED 406 emitted from the second light transmission face 482 can be irradiated on the garnish light transmission portion 432. According to the above configuration, a light for lighting the license plate 405 and a light for irradiating the garnish light transmission portion 432 are simultaneously generated by the upper face reflecting faces 463*a*, 463*b*, the central emitting face 464, which are provided in the sealing member 462 of LED 406, and by the casing 480. Accordingly, it is unnecessary to specially provide a spectral member. Therefore, a space in which the illumination device is arranged can be reduced. Further, since the number of parts is small, the attaching work can be easily performed.

It should be noted that the present invention is not limited by the above explanations of the embodiments of the present invention. Variations may be made by those skilled in the art without departing from the spirit and scope of the present invention.

The illumination device according to the present invention is used for illuminating the license plate and the circumference of the license plate of the vehicle. Further, the present invention can be applied to various types of vehicles.

What is claimed is:

1. An illumination device for a license plate, comprising:
   at least one light source arranged in a circumference of the license plate;
   a garnish for accommodating the at least one light source and having a light transmitting part; and
   a reflector converting a light emitted from the at least one light source into a first light irradiating the license plate and a second light irradiating the garnish,
   wherein the light source consists of a white LED.

2. The illumination device according to claim 1, wherein a plurality of the at least one light sources are arranged with spaces along the upper end of the license plate.

3. The illumination device according to claim 1, wherein a light transmissive cover having a light diffusion treatment is arranged so as to cover the at least one light source and the reflective member.

4. The illumination device according to claim 1, wherein said reflector comprises:
   a spectral member for directing said first light to irradiate the license plate and said second light to irradiate the garnish from the light emitted from the at least one light source.

5. The illumination device according to claim 4, wherein the spectral member comprises:
   a light guide member having a light transmitting property; and
   the light guide member including:
      a light incident face upon which light emitted from the at least one light source is incident;
      a first light emitting face for emitting the first light from a portion of the light incident from the light incident face; and
      a second light emitting face for emitting th second light from a portion of the light incident from the light incident face.

6. The illumination device according to claim 4, wherein the spectral member includes:
   a first reflecting face to direct said first light from a portion of the received light; and
   a second reflecting face to direct said second light from a portion of the received light.

7. The illumination device according to claim 1,
   wherein the at least one light source includes:
   a sealing member for directing said first light to irradiate the license plate and said second light to irradiate the garnish.

8. The illumination device according to claim 7, wherein a direction of the first light is substantially perpendicular to an optical axis of the light emitted from the light emitting element, and a direction of the second light is substantially parallel to the optical axis of the light emitted from the light emitting element.

9. The illumination device according to claim 1, wherein said reflector comprises:
   a spectral member for generating said first light to irradiate the light transmitting part from a portion of the light emitted from the light source, wherein the light source directly irradiates the first light on the license plate.

10. The illumination device according to claim 1, further comprising:
a spectral member for direction said first light to irradiate the license plate from a portion of the light emitted from the at least one light source,
wherein said light transmitting part directly receives the light emitted from said at least one light source.

11. An illumination device for a license plate, comprising:
at least one light source arranged in a circumference of the license plate;
a garnish for accommodating the at least one light source and having a light transmitting part; and
means for converting a light emitted from the at least one light source into a first light irradiating the license plate and a second light irradiating the garnish,
wherein the light source consists of a white LED.

12. The illumination device according to claim 11, wherein said means for converting comprises:
a spectral member for directing said first light to irradiate the license plate and said second light to irradiate the garnish from the light emitted from the at least one light source.

13. The illumination device according to claim 12, wherein the spectral member comprises:
a light guide member having a light transmitting property, wherein the light guide member includes:
a light incident face upon which light emitted from the at least one light source is incident;
a first light emitting face for emitting the first light from a portion of the light incident from the light incident face; and
a second light emitting face for emitting the second light from a portion of the light incident from the light incident face.

14. The illumination device according to claim 11, wherein the spectral member includes:
a first reflecting face to direct said first light from a portion of the received light; and
a second reflecting face to direct said second light from a portion of the received light.

15. The illumination device according to claim 11, wherein the at least one light source includes:
sealing means for sealing said at least one light source and for directing said first light to irradiate the license plate and said second light to irradiate the garnish.

16. The illumination device according to claim 15, wherein said means for converting comprises:
means for reflecting and guiding said first light to irradiate the license plate and said second light to irradiate the garnish.

17. The illumination device according to claim 15, wherein a direction of the first light is substantially perpendicular to optical axis of the light emitted from the light emitting element, and a direction of the second light is substantially parallel to the optical axis of the light emitted from the light emitting element.

18. The illumination device according to claim 11, wherein said means for converting comprises:
a spectral member for directing said first light to irradiate the light transmitting part from a portion of the light emitted from the at least one light source,
wherein the light source directly irradiates the first light on the license plate.

19. The illumination device according to claim 11, wherein said means for converting comprises:
a spectral member for directing said first light to irradiate the license plate from a portion of the light emitted from the at least one light source,
wherein said light transmitting part directly receives the light emitted from said at least one light source.

* * * * *